United States Patent [19]

Keeley et al.

[11] Patent Number: 5,341,508
[45] Date of Patent: Aug. 23, 1994

[54] PROCESSING UNIT HAVING MULTIPLE SYNCHRONOUS BUS FOR SHARING ACCESS AND REGULATING SYSTEM BUS ACCESS TO SYNCHRONOUS BUS

[75] Inventors: James W. Keeley, Nashua, N.H.; Thomas F. Joyce, Westford, Mass.

[73] Assignee: Bull HN Information Systems Inc., Billerica, Mass.

[21] Appl. No.: 771,289

[22] Filed: Oct. 4, 1991

[51] Int. Cl.$^5$ .............. G06F 13/42; G06F 13/38; G06F 13/00
[52] U.S. Cl. .................... 395/800; 395/325; 395/550; 364/240; 364/271; 364/927.93; 364/927.97; 364/927.98; 364/927.99; 364/950; 364/950.3; 364/977.5; 364/DIG. 2
[58] Field of Search ............... 395/800, 200, 275, 325, 395/550

[56] References Cited

U.S. PATENT DOCUMENTS

| | | | |
|---|---|---|---|
| 4,041,472 | 8/1977 | Shah et al. | 395/325 |
| 4,779,089 | 10/1988 | Theus | 340/825.5 |
| 4,932,040 | 6/1990 | Barlow | 375/111 |
| 5,062,037 | 10/1991 | Shorter et al. | 395/325 |
| 5,063,500 | 11/1991 | Shorter | 395/200 |
| 5,097,437 | 3/1992 | Larson | 395/775 |
| 5,142,672 | 8/1992 | Johnson et al. | 395/500 |
| 5,220,651 | 6/1993 | Larson | 395/250 |
| 5,237,567 | 8/1993 | Nay et al. | 370/85.1 |
| 5,253,347 | 10/1993 | Bagnoli et al. | 395/325 |

*Primary Examiner*—Thomas C. Lee
*Assistant Examiner*—Paul Harrity
*Attorney, Agent, or Firm*—Faith F. Driscoll; John S. Solakian

[57] ABSTRACT

A processing unit tightly couples to a system bus and includes a local memory which is accessible from such bus. The processing unit includes a high performance microprocessor which tightly couples to the local memory through a high speed synchronous bus shared with a plurality of synchronous state machines. A microprocessor internal bus state machine and the plurality of state machines control local bus accesses for transferring commands generated by the microprocessor and commands transferred from the system bus under the control of an external state machine for execution by a local memory state machine and the processor state machine, respectively, which also couples to the system bus.

14 Claims, 12 Drawing Sheets

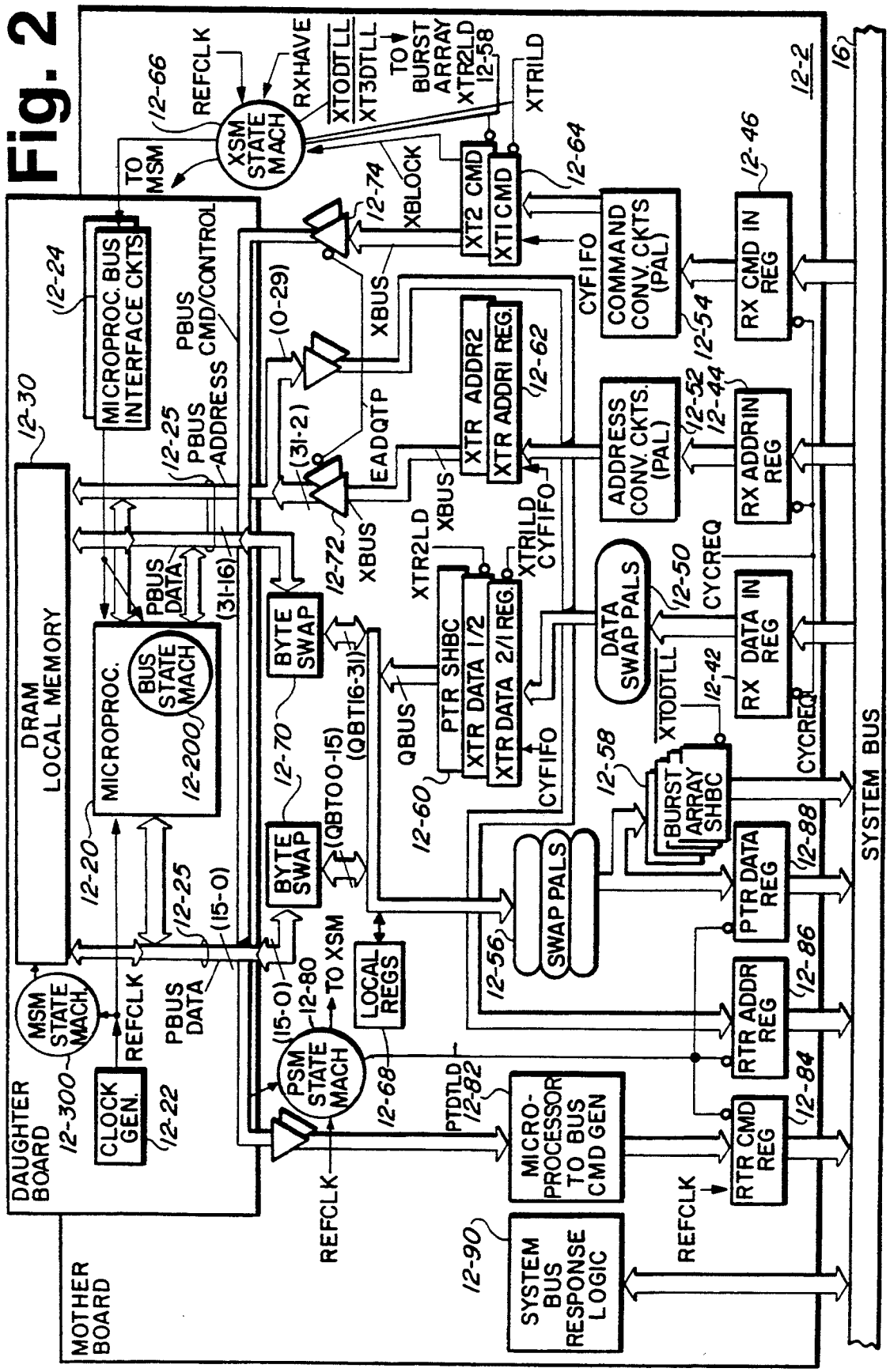

MICROPROCESSOR BUS STATE MACHINE OVERVIEW

MSM STATE MACHINE OVERVIEW

PSM OVERVIEW

XSM OVERVIEW

PROCESSING UNIT HAVING MULTIPLE SYNCHRONOUS BUS FOR SHARING ACCESS AND REGULATING SYSTEM BUS ACCESS TO SYNCHRONOUS BUS

RELATED APPLICATIONS

1. The patent application of Thomas F. Joyce and James W. Keeley entitled, "Method and Apparatus for Avoiding Processor Deadly Embrace in a Multiprocessor System," filed on Oct. 4, 1991, bearing Ser. No. 07/771,296, now U.S. Pat. No. 5,283,870, which is assigned to the same assignee as this patent application.

2. The patent application of James W. Keeley entitled, "Bus Interface State Machines," filed on Oct. 4, 1991, bearing Ser. No. 07/771,712, still pending, which is assigned to the same assignee as this patent application.

3. The patent application of Thomas F. Joyce and James W. Keeley entitled, "Programmable Bus State Machine," filed on Oct. 4, 1991, bearing Ser. No. 07/771,297, still pending, which is assigned to the same assignee as this patent application.

BACKGROUND OF THE INVENTION

1. Field of Use

The present invention relates to data processing systems and more particularly to high performance microprocessor based systems.

2. Prior Art

To improve overall performance, systems have utilized high performance microprocessors, such as the Intel 486 microprocessor. While this has resulted in increased performance, systems which utilize processors having on-board local memories have been unable to operate at optimum speeds because of loosely coupled processor and memory elements.

Accordingly, it is a primary object of the present invention to provide a high performance system.

It is a more specific object of the present invention to provide a high performance microprocessor based system.

SUMMARY OF THE INVENTION

The above and other object of the present invention are achieved in a preferred embodiment of a processing unit which tightly couples to a system bus and includes a local memory. According to the present invention, the processing unit includes a high performance microprocessor which tightly couples to the local memory through a synchronous operated high speed local bus in common with a plurality of synchronous state machines. The state machines operate at microprocessor speeds for sharing the local bus with minimum conflict.

In the preferred embodiment, the microprocessor includes a bus state machine which controls access to the local bus and issues local memory and I/O read and write commands. A processor state machine (PSM) which couples to the system bus controls the transfer of issued microprocessor read and write commands from the local bus to the system bus. An external state machine (XSM), which couples to the system bus, controls the transfer of read and write commands received from the system bus to the local bus while a memory state machine (MSM) controls the local memory's processing of locally and externally generated memory read and write commands.

In accordance with the present invention, each state machine operates independently to carry out the tasks assigned to it to complete each operation within a minimum amount of time so as to maintain optimum processor performance. The microprocessor and XSM state machines function as master units in initiating local bus operations while the PSM and MSM state machines operate as slave units in carrying out the initiated local bus operations. The operations of the state machines are synchronized as required through simple interfaces for interlocking their operations in accessing the local bus without interference so as to maintain optimum performance.

The above and other objects of the present invention will be better understood from the following description when taken in connection with the accompanying drawings.

DESCRIPTION OF THE DRAWINGS

FIG. 2 shows in greater detail, the processing unit of FIG. 1 constructed according to the present invention to include a plurality of tightly coupled synchronous state machines.

DETAILED DESCRIPTION OF THE PREFERRED EMBODIMENT

Figure 1:
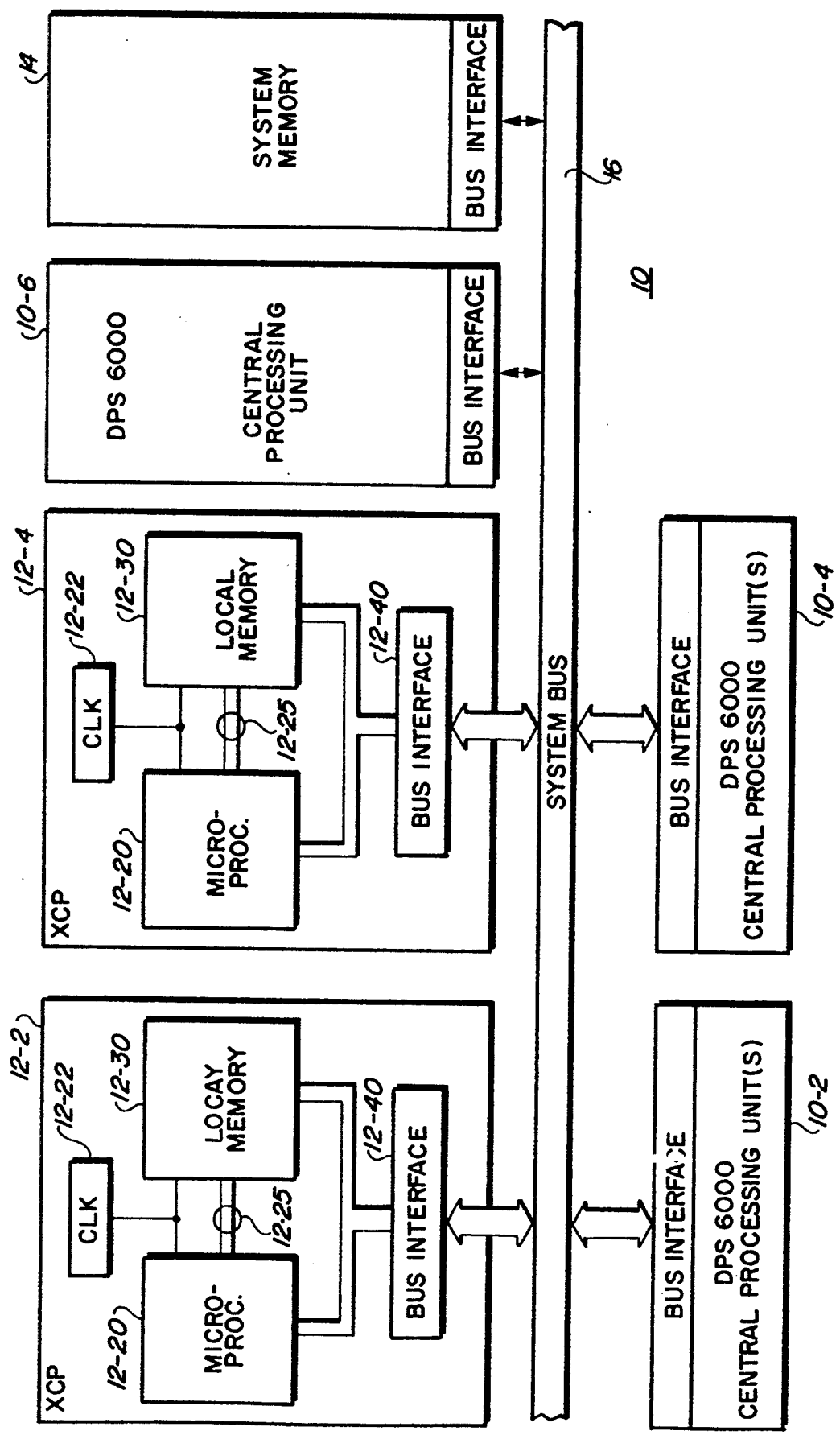
FIG. 1 is a block diagram of a multiprocessor system which incorporates the processing unit of the present invention.

Description of FIG. 1

FIG. 1 shows a multiprocessor system 10 which includes a plurality of central processing units 10-2 through 10-6 and peer processors 12-2 and 12-4 which tightly couple in common to a system bus 16 and to a main memory or system memory 14. Each processor, as shown, includes a bus interface area which enables the unit to transmit or receive requests in the form of commands, interrupts, data or responses/status to another unit on system bus 16. In the preferred embodiment, the system bus 16 operates asynchronously and uses a split bus cycle protocol which provides higher performance by granting other units bus cycles during the period of time a unit is waiting for main memory to furnish data in response to an earlier request made by that unit. For further information regarding this type of bus interface and operation, reference may be made to U.S. Pat. No. 3,997,896.

Referring to FIG. 1, it is seen that each peer processor 12-2 and 12-4 includes a microprocessor 12-20, a local memory 12-30 and interface buses which couple to the bus interface circuits of block 12-40, as shown. The microprocessor 12-20 and local memory 12-30 are tightly coupled through a local processor bus 12-25. The microprocessor 12-20 is a high performance 32-bit processor which operates at clock speeds of up to 33 MHz and in the preferred embodiment corresponds to an Intel 80486 chip.

The Intel 80486 chip includes a microprocessor, a floating-point math coprocessor, a memory cache controller and an 8K RAM cache unit. The principal processing function is performed by the microprocessor while complex processing functions, such as floating operations, are performed by the math coprocessor. The internal cache unit provides fast access to the data required for processing. In the preferred embodiment, peer processors 12-2 and 12-4 operate under the control of a UNIX operating system.

In FIG. 1, the processors 10-2 through 10-6 function as host processors. In the preferred embodiment, each processor takes the form of a Bull DPS6000 system which operates under the control of the Bull HVS proprietary operating system. In the system of FIG. 1, each of the processors are organized to operate in an independent manner and have access to the full complement of system resources, such as input/output units, main memory and the like.

Description of FIG. 2

FIG. 2 shows in greater detail, the processor 12-2 of FIG. 1. In the preferred embodiment, the microprocessor 12-20 and local memory 12-30, along with associated state machines 12-200 and 12-300, control circuits, in addition to clock generation circuits of block 12-22 are contained on a single daughter board, as shown. The clock generator circuits of block 12-22 generate a single frequency clock signal CLKREF of 33 MHz which provides the fundamental timing and internal operating frequency for microprocessor 12-20, in addition to all of the other circuits which make up processor 12-2. The system and bus interface circuits 12-24, input and output registers and state machines 12-80 and 12-66 are contained on the mother board. These two boards make up the entire processor.

In greater detail, the microprocessor 12-2 and local memory 12-30 are tightly coupled to the address, data and command/control processor bus lines of local bus 12-25, as shown. The circuits of block 12-24 serve as interface circuits which apply control signals to the microprocessor's bus interface which couples internally to the bus state machine 12-200. State machine 12-200 is used to control the microprocessor's access to local bus 12-25 by the generation of the proper bus protocol as a function of control signals generated by external state machine (XSM) 12-66. As explained herein, the XSM 12-66 controls the accessing of local memory 12-30, in response to external requests received from system bus 16.

As shown, the external requests received from system bus 16 are loaded into the receive data, address and command registers 12-42 through 12-46, in response to an enable signal CYCREQ generated by clock logic circuits, not shown. The address and command signals are converted into the appropriate form by address and command converter circuits of blocks 12-52 and 12-54 and stored in available registers of the two sets of queue registers of blocks 12-62 and 12-64. As shown, the registers of block 12-62 connect in common through tristate circuits to an output bus (X bus). Thereafter, the stored address and command signals are applied to the processor bus via the driver circuits of blocks 12-72 and 12-74, in response to an enabling signal EADQTP.

Any data associated with an external request loaded into register 12-42 is reordered as required by the programmable array logic (PALs) of block 12-50 and stored into the appropriate one of the registers of block 12-60 which connect in common to an output bus (Q bus) through tristate circuits. The different bytes of the data words are swapped from the so-called big endian format of the system bus to the little endjan format utilized by microprocessor 12-20. This is accomplished by byte swap circuits of block 12-70 which is implemented by the proper reordering of connector pin connections.

The processor state machine (PSM) of block 12-80 controls the transfer and processing of transactions or requests initiated by microprocessor 12-20. As shown, commands generated by microprocessor 12-20 specifying an operation on system bus 16 are applied to a microprocessor to bus command generator of block 12-82 which, in turn, generates the appropriate system bus command. The bus command is loaded into a processor command register 12-84, along with the appropriate address and data. The address and data are loaded into registers 12-86 and 12-88, respectively, via an address bus and the Q data bus as shown in FIG. 2. This is all done in response to an enabling load signal PTDTLD generated by the PSM state machine 12-80 of control signals applied as an input to generator 12-82 and to the system bus response circuits of block 12-90.

Additionally, the PSM 12-80 processes internal I/O requests initiated by microprocessor 12-20 for reading/writing different ones of a plurality of internal registers 12-68 connected to the Q bus. These registers include a channel address register (CAR) and a physical address register (PAR). The CAR register is used to store channel number information transmitted to system bus 16 as part of an I/O command during normal I/O operations. The PAR register is used to store transaction address information. These registers are described in greater detail in the Appendix.

Description of FIGS. 3a-3d

FIGS. 3a through 3d show in greater detail, the state machines 12-66, 12-80 and 12-300, in addition to bus interface circuits 12-24.

Figure 3A:
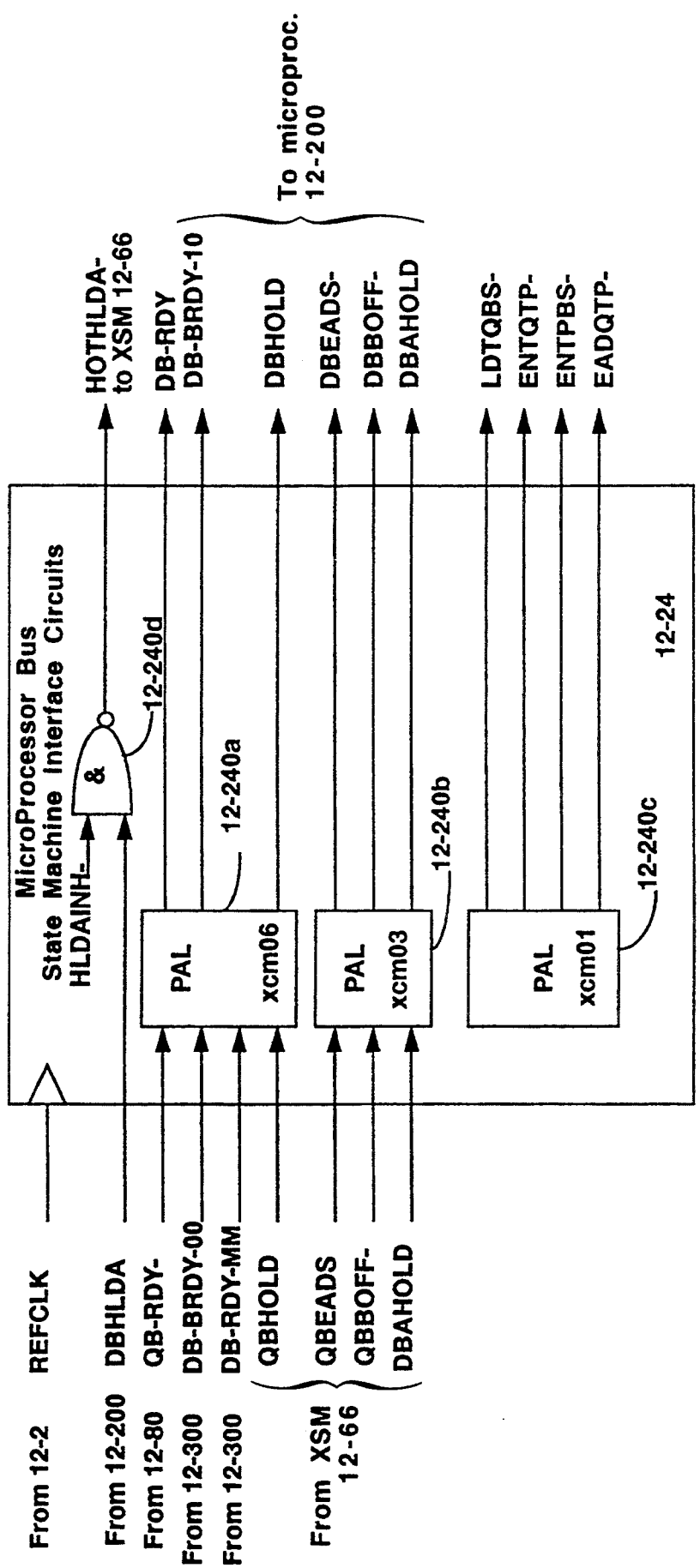
FIGS. 3a, 3b, 3c, and 3d respectively show in block diagram form, the microprocessor bus, memory, processor, and external state machines and bus interface circuits of FIG. 2 of the present invention.

As shown in FIG. 3a, the bus interface circuits 12-24 include three clocked programmable array logic (PAL) circuits 12-240a through 12-240c, in addition to a NAND gate 12-240d. The PAL circuits connect to different ones of the state machines 12-200, 12-300, 12-66 and 12-80 and each receives clock signal REFCLK from clock generator 12-22.

In greater detail, PAL circuit 12-240a receives as inputs, signals QBRDY and DBRDY-MM and generates output signal DB-RDY. PAL circuit 12-240b receives as inputs, signals QBHOLD, QBEADS, QBBOFF− and DBAHOLD+ and generates as outputs DBHOLD, DBEADS−, DBBOFF− and DBAHOLD+. Lastly, PAL circuit 12-240c receives a number of input signals which it combines to produce enabling register transfer signals LDTQBS−, ENTQTP−, ENTPBS− and EADQTP−. NAND gate 12-240d combines signal DBHLDA from bus state machine 12-200 with signal HLDAINH− from memory state machine MSM12-300 to produce signal HOTHLDA. The equations for generating each of these signals by the bus interface circuits 12-200 are set forth in the Appendix.

Memory State Machine 12-300

Figure 3B:
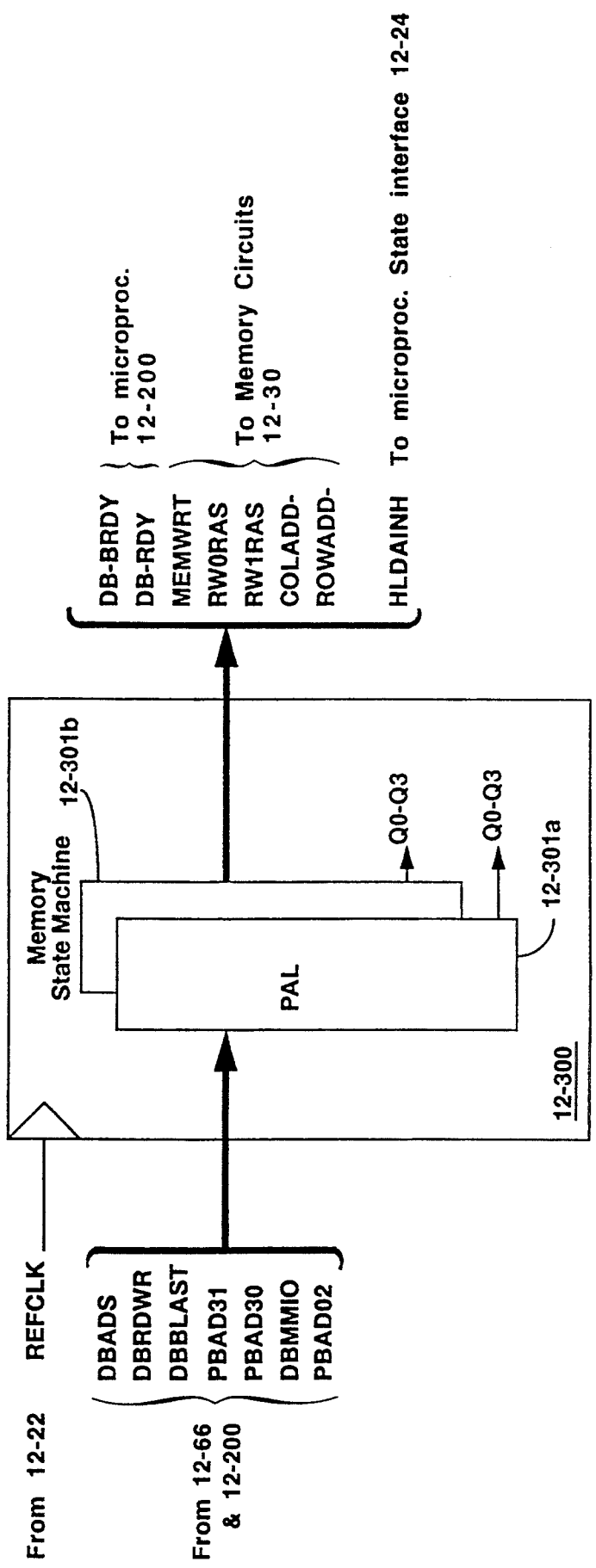

FIG. 3b shows in greater detail, the memory state machine (MSM) 12-300. As shown, MSM 12-300 includes two clocked programmable array logic (PAL) circuits 12-301a and 12-301B, each of which receives a clock signal REFCLK from clock generator 12-22. The PAL circuits 12-301a and 12-301b connect to different ones of the state machines 12-200 and 12-66, in addition to memory circuits 12-30 and microprocessor bus interface circuits 12-24. Each of the PAL circuits receives clock signal REFCLK from clock generator 12-22.

As shown, both of the PALs 12-301a and 12-301b receive as inputs, signals DBADS+, DBWRRD−, DBBLAST−, PBAD31−, PBAD30−, DBMMIO− and PBDA02+. In parallel, PALs 12-301a and 12-301b generate as outputs, ready signals DB-RDY-MM and DB-BRDY−, memory write signal MEMWRT, column address signal COLADD−, row address signal ROWADD− and hold acknowledge inhibit signal HLDAINH−. Additionally, each of the PAL circuits generates a plurality of internal state signals Q0 through Q3. The state signals are used to define when the output signals should be generated as a function of the type of memory operation being performed. The equations for generating each of these signals by the memory state machine MSM 12-300 are set forth in the Appendix. Other PAL circuits included in MSM 12-300 are used to generate other necessary memory signals such as row and column address strobe signals RAS and CAS for enabling memory circuits 12-30 to carry out the requested memory read and write operations.

State Machine (PSM) 12-80

Figure 3C:
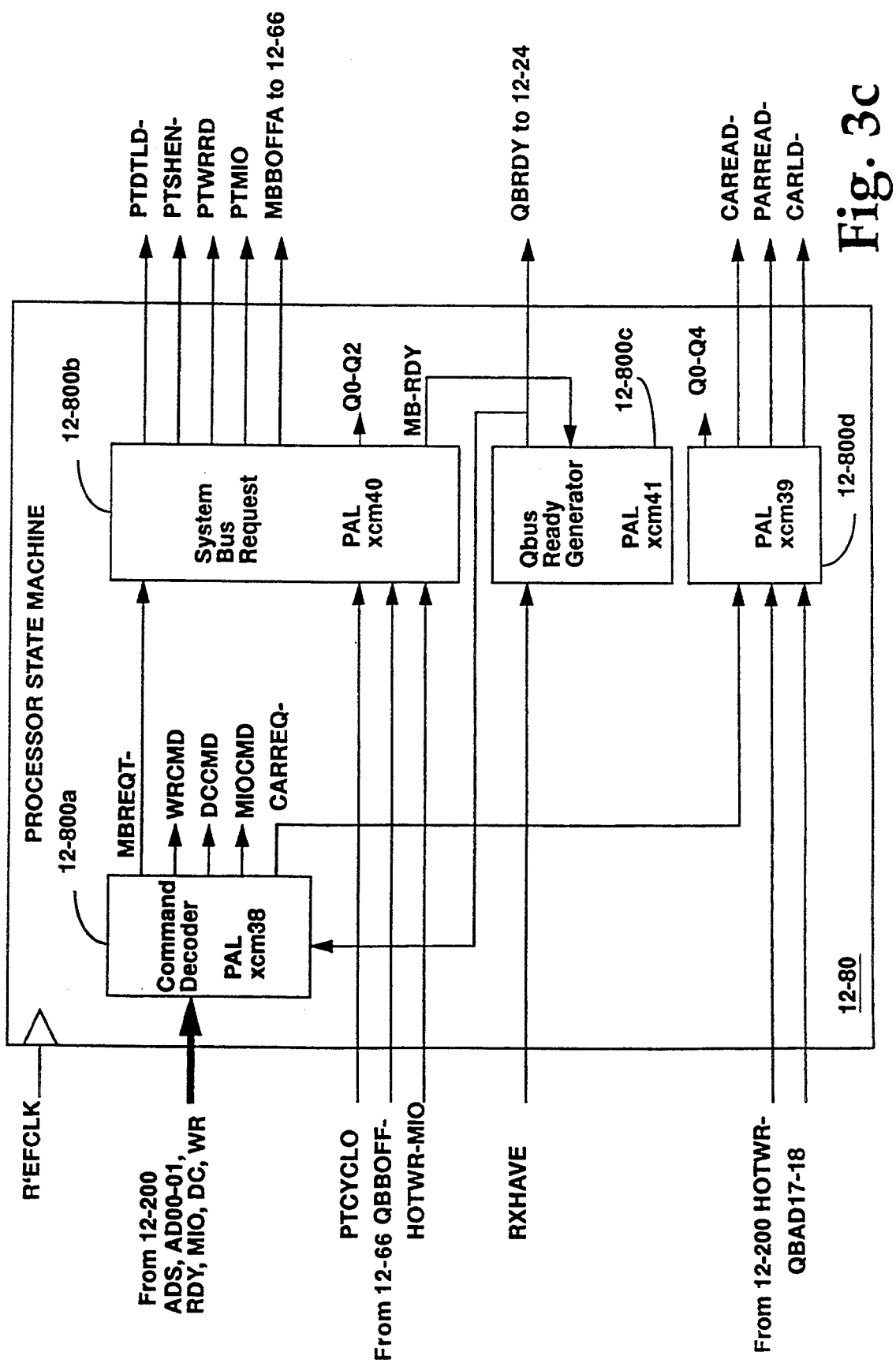

FIG. 3c shows in greater detail, the circuits of the processor state machine (PSM) 12-80. As shown, PSM 12-80 includes four clocked programmable array logic (PAL) circuits 12-800a through 12-800d, each of which receives clock signal REFCLK from clock generator 12-22. The PAL circuit 12-800a functions as a command decoder which decodes the microprocessor command signals generated by the microprocessor's bus state machine 12-200. It starts the operation of the state machines contained on the mother board. PAL circuit 12-800a provides control signals to system bus request PAL circuit 12-800b and to Q bus ready generator PAL circuit 12-800c as shown in FIG. 3c. In greater detail, PAL circuit 12-800a receives as inputs, address strobe signal ADS, address signals AD00 and AD01, ready signal RDY, data/control signal DC, read/write signal WR, and memory I/O signal MIO from microprocessor bus state machine 12-200, in addition to the Q bus ready signal QB-RDY from PAL circuit 12-800c. The PAL circuit 12-800a produces as outputs, write command signal WRCMD+, data/control signal DCCMD+, memory I/O command signal MIOCMD+, and system bus request signal MBREQT−.

The PAL circuit 12-800b receives as inputs, the system bus request signal MBREQT− from PAL circuit 12-800a, a system bus cycle over signal PTCYCLO+ from the system bus circuits, a Q bus backoff signal QBBOFF− from XSM state machine 12-66, in addition to microprocessor write and memory I/O signals HOTWR− and HOTMIO−. The PAL circuit 12-800b produces as outputs, load register signal PTDTLD−, system bus backoff allow signal MBOFFA+, system bus ready signal MB-RDY−, second half enable signal PTSHEN−, system bus write signal PTWRRD, and system bus memory I/O signal PTMIO+. Additionally, PAL circuit 12-800b generates a plurality of state output signals Q0 through Q2 which are used internally to determine when the output signals are generated.

The PAL circuit 12-800c collects all of the ready signals from the mother board state machines and in response to the next REFCLK signal, sends ready signals to the microprocessor bus state machine and to the mother board state machines. The PAL circuit receives as inputs, a request received signal RXHAVE+, system bus ready signal MB-RDY−, an external memory reference signal RXMREF+, an external second half bus cycle signal RXSHBC+, an external negative acknowledgement signal RXNAKR+, receive data signals RXDT13, RXDT14, and I/O read function code 1 signal FCODEI+. PAL circuit 12-800c generates as outputs, Q bus ready signal and QB-RDY− signal.

PAL circuit 12-800d is used for signalling the internal CAR and PAR registers of block 12-68 when there is a read or write operation being performed on the register. The PAL circuit 12-800d receives as inputs, microprocessor read/write signal HOTWR−, CAR request signals CARREQ− from PAL circuit 12-800a, in addition to address bits QBAD 17 and 18. The PAL circuit 12-800d generates as outputs, CAR register read signal CARREAD−, PAR register read signal PARREAD− and CAR load signal CARLD−. It also generates a plurality of output state signals Q0 through Q4 which are used internally to determine when the output signals are generated. The equations for generating each of the signals by the PSM state machine 12-80 are set forth in the Appendix.

External State Machine (XSM) 12-66

Figure 3D:
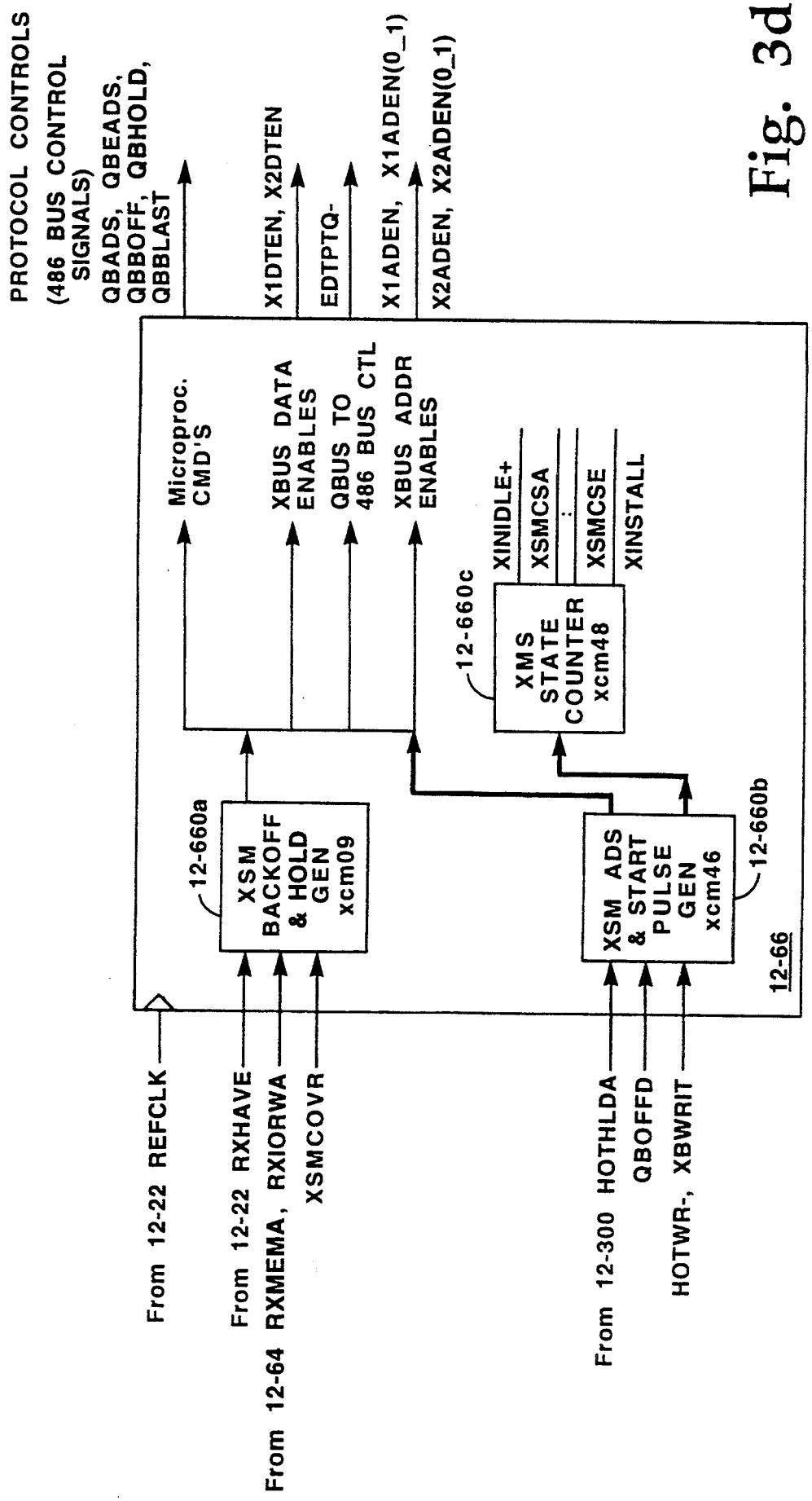

FIG. 3d shows in greater detail, the external state machine (XSM) 12-66. The XSM 12-66 includes three clocked programmable array logic (PAL) circuits 12-660a, 12-660b and 12-660c, each of which receives clock signal REFCLK from clock generator 12-22. The PAL circuit 12-660a functions as a backoff and hold generator. It receives as inputs, receive command signals R/HAVE+, RXIORWA+, and RXMEMA+, cycle over signal XSMCOVR+ from the system bus circuits, in addition to internally generated X bus busy signals XTR1BSY+, XTR2BSY+ and idle and stall state signals XNIDLE+ and XINSTAL+ from PAL circuit 12-660c. PAL circuit 12-660a generates as outputs, Q bus backoff signal QBBOFF− and Q bus hold signal QBHOLD+.

PAL circuit 12-660b functions as an address strobe and start pulse generator. It receives as inputs, a processor bus hold acknowledge signal HOTHLDA−, a Q bus backoff delayed signal QBOFFD+, a processor bus read/write command signal HOTWR−, an external write signal XBWRIT in addition to the internally generated idle and stall state signals XINDLE+ and XINSTAL+.

PAL circuit 12-660b generates as outputs, Q bus address control signals QBADS and QBEADS, X data bus enable signals XIDTEN and X2DTEN, Q bus to processor data bus enable signal EDTPTQ− and start pulse signal XSMSTRT−. The start pulse signal is applied to the state machine counter PAL circuit 12-660c.

The PAL circuit 12-660c receives as inputs, start signal XSMSTRT−, clock reference signal REFCLK+, cycle over signal XSMCOVR+, in addition to internally generated stop and stall signals XSMSTOP+ and XSMSTAL+. The PAL circuit 12-660c generates as outputs, idle and stall state signals XINIDLE+ and XINSTAL+, in addition to a plurality of state signals XSMCSA through XSMCSE which are used to generate further control signals for carrying out the requested operations. The equations for generating each of these signals by the XSM state machine 12-66 are set forth in the Appendix.

Figure 4:
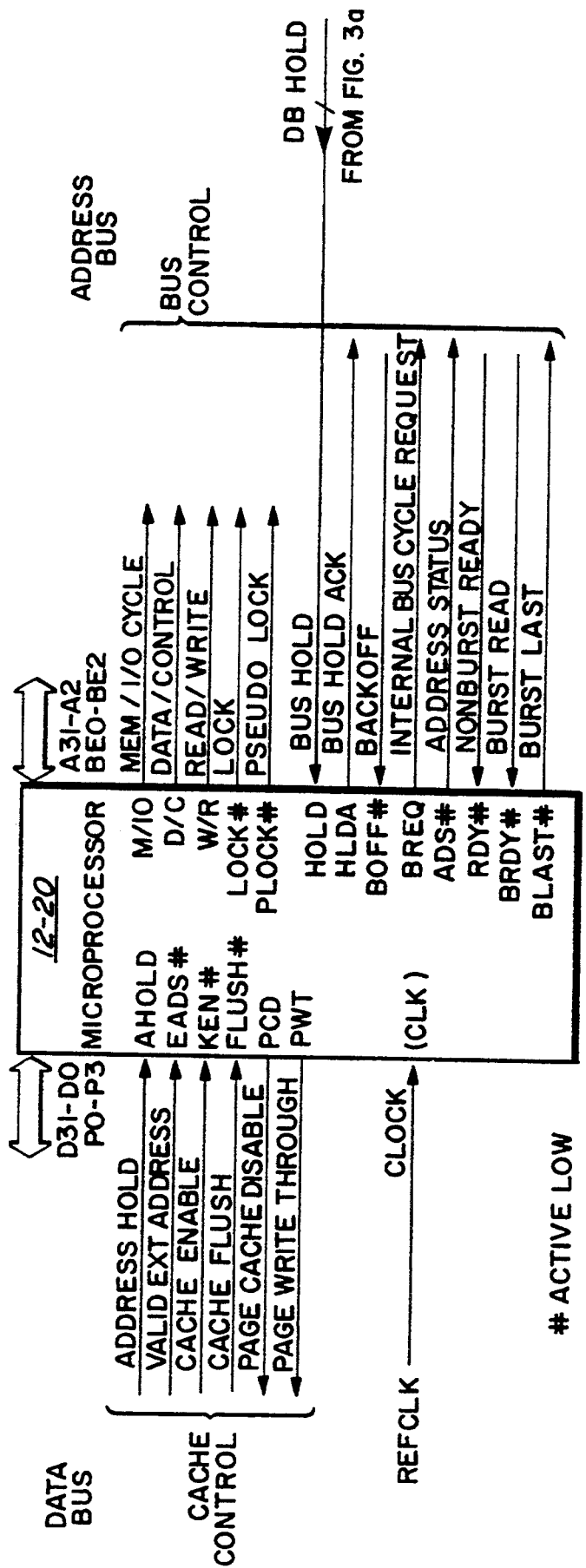
FIG. 4 shows in block form, the microprocessor of FIG. 2.

Description of FIG. 4

FIG. 4 shows in greater detail, the microprocessor 12-20 and the different interface signals. The interfaces are divided into sections which denote the different functions which do not necessarily correspond with the physical layout of the Intel 80486 chip. The address bus and bus control lines comprise the majority of the lines. The address lines are bidirectional for accommodating the cache bus snooping capability. The cache control section includes six pins for controlling the microprocessor's internal cache. The cache enable (KEN) input is most frequently used to disable areas of memory that cannot be cached.

The address hold (AHOLD) and external address strobe (EADS) inputs allow an external device to present the microprocessor 12-20 with an address. If the address matches an address in the microprocessor's internal cache, the associated data is flagged as invalid. The flush (FLUSH) cache input is used to inform the microprocessor that the entire contents of its cache are invalid. The page write-through (PWT) and page cache-disable (PCD) output pins reflect the states of the page attribute bit settings in internal page table entry or page directory entry registers. They indicate caching control that software has exerted over logical memory pages.

The bus control section includes thirteen pins for controlling the processor's bus under the microprocessor's bus control state machine. The bus request (BREQ) output signal indicates that the microprocessor needs the address/data bus. The back off input (BOFF) enables an external device to take control of the entire address/data bus even within an active, yet incomplete cycle. The pseudo lock output signal (PLOCK) is used by the microprocessor to indicate that the transaction it is performing requires more than one bus cycle to complete. By contrast, the bus lock signal (LOCK) is used to signal a critical read-modify-write operation in which no other system element can examine the item being modified until the current operation is complete. The microprocessor will not allow a bus hold request (HOLD) to take place wherein another bus master can complete control of the bus. That is, the microprocessor will not generate a hold acknowledge signal (HLDA), in response to a bus hold request.

The memory/input-output (M/IO), data/control (D/C), and write/read (W/R) signals are used to define the type of bus cycle being initiated. The address status output signal (ADS) indicates when these bus cycle definition signals and address signals are valid. The non-burst ready input signal (RDY) indicates that the current bus cycle is complete. The burst ready input signal (BRDY) and the burst last signal (BLAST) are used to carry out burst transfer operations.

The burst ready signal indicates that the current cycle is complete and the system will continue data transfer in the next clock cycle, unless the signal BLAST is presented. The BLAST signal signifies that the burst transfer is complete.

For further information regarding the use of these signals, reference may be made to the Intel publication entitled, "i486 MICROPROCESSOR," dated November, 1989, Order Number: 240440-002.

DESCRIPTION OF OPERATION

With reference to FIGS. 2 through 3d, the operation of the apparatus of the present invention will now be described with reference to FIGS. 5a through 5d and FIG. 6. FIGS. 5a through 5d are state diagrams which illustrate the overall operations of the state machines of FIG. 2.

Figure 5A:
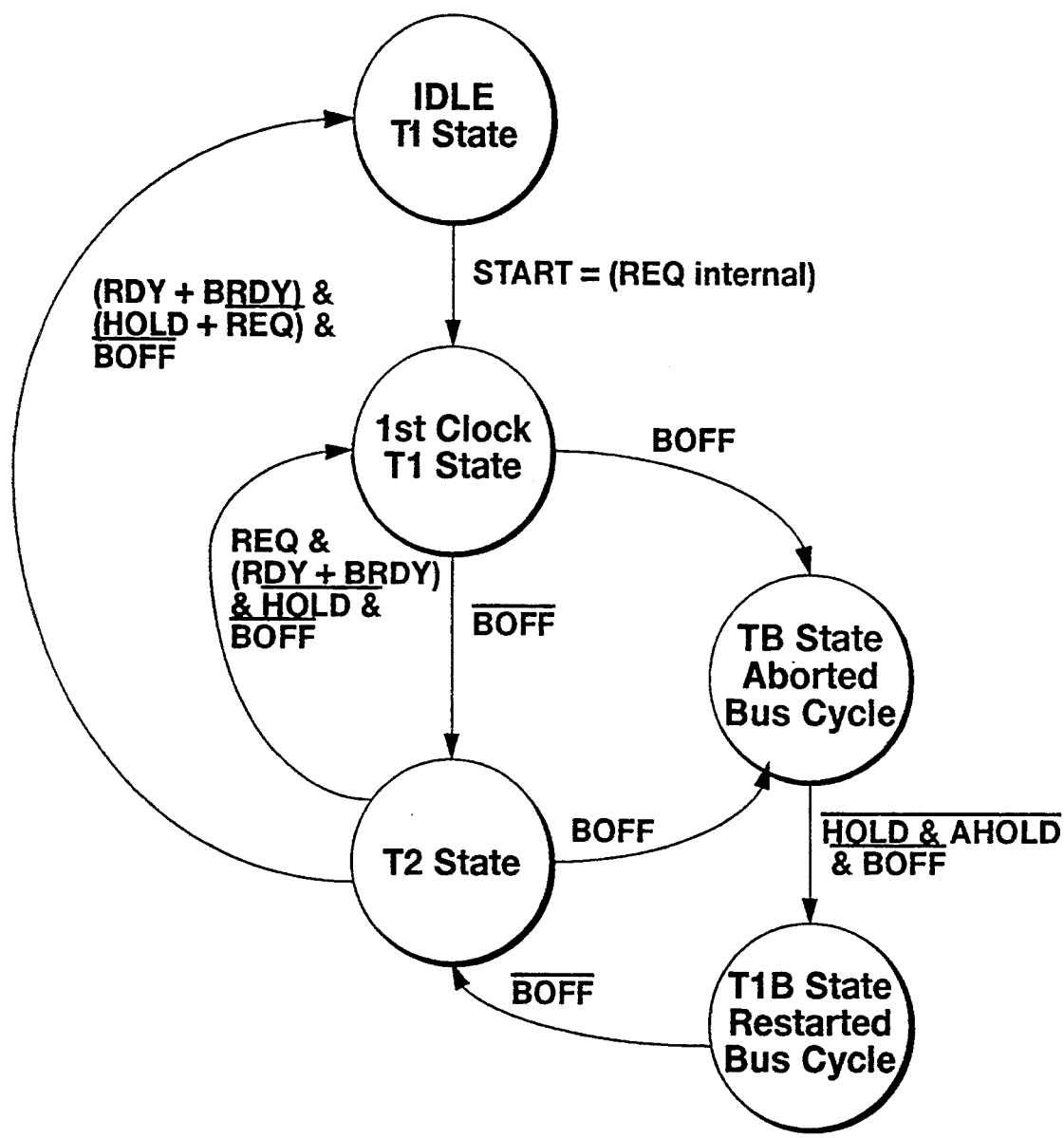
FIGS. 5a, 5b, 5c, and 5d respectively are state diagrams used for illustrating the operation of different ones of the microprocessor bus, memory, processor, and external state machines of FIG. 2.

Description of FIG. 5a

In greater detail, FIG. 5a illustrates the overall operation of the microprocessor's bus state machine 12-200 in accessing synchronous bus 12-25 for executing memory read/write operations and I/O operations. As described, this state machine follows that of the microprocessor and in the preferred embodiment, follows the operation of the Intel 486 microprocessor. As seen from FIG. 5a, the state machine 12-200 in an idle state (Ti) and remains in that state until it receives an internal request from the microprocessor in the absence of a hold (!HOLD) and a backoff (!BOFF). When that occurs, it sequences to state T1 which corresponds to the first clock cycle of a bus cycle. In this state, the valid address and status lines are driven and the address strobe ADS is generated.

In the absence of a backoff, state machine 12-200 sequences to state T2 as shown. When in this state, the second and subsequent bus cycles are performed. During each such cycle, the data lines are driven in the case of a write operation or in the case of a read, the states of the ready (RDY) and burst ready (BRDY) lines are sampled. When a backoff is issued (BOFF), the bus cycle is aborted and the state machine 12-200 sequences to state Tb. While in this state, machine 12-200 performs the second and subsequent clock cycles of an aborted bus cycle. As shown in FIG. 5a, the state machine 12-200 remains in state Tb until there is no longer a hold (!HOLD) and backoff (!BOFF) present. At that time, state machine 12-200 restates the bus cycle by sequencing to state T1b. While in this state, machine 12-200 performs the first clock cycle of a restatted bus cycle. As in state T1, it drives the valid address and status lines in addition to generating an address strobe (ADS).

As seen from FIG. 5a, state machine 12-200 sequences to state T2 to complete the operation. It is also seen that a backoff (BOFF) also affects sequencing from state T1 to state Tb in the same manner. The state machine 12-200 sequences from state T2 to state T1 in the case of another request or back to state Ti in the absence of a request under the conditions noted in FIG. 5a.

Figure 5B:
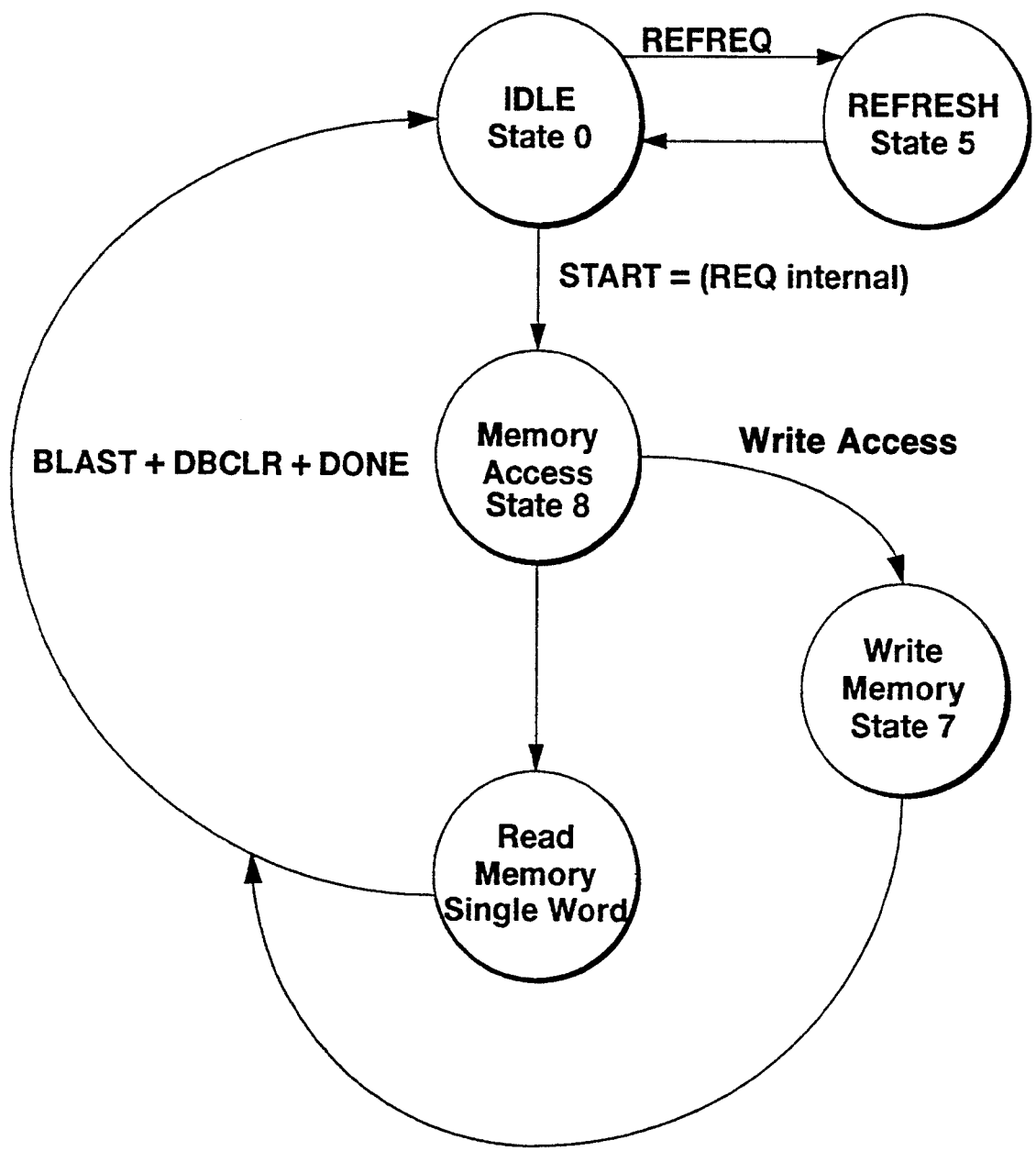

Description of FIG. 5b

FIG. 5b illustrates the overall operation of memory state machine (MSM) 12-300 in processing read and write commands received from microprocessor 12-20 and from system bus 16. As shown, MSM 12-300 starts initially in the idle state (state0). In response to a memory request, memory state machine 12-300 sequences to a memory access state (state8). If the request is a read, MSM 12-300 then sequences to a read memory single word state (stateA) as shown. When in this state, MSM 12-300 causes the local memory 12-30 to read out the requested data and transfer it to bus 12-25. In the case of a single word transfer, MSM 12-300 returns to the idle state upon the completion of the read operation (DONE). If the transfer involves a multiple word transfer, MSM 12-300 remains in stateA until the local memory 12-30 completes the read operation (DONE) or in the case of a burst operation, until the last word is read out from local memory 12-30 and transferred to bus 12-25 (BLAST). Of course, if a clear operation occurs (DBCLR), MSM 12-300 returns to the idle state.

When the memory request is a write, MSM 12-300 sequences from state8 to a write memory state (state7) as shown in FIG. 5b during which it causes local memory 12-30 to write the data into the specified location. At the completion of the write, MSM 12-300 returns to the idle state. Additionally, MSM 12-300 also in response to a refresh request sequences to a refresh state (state5). When in this state, MSM 12-300 causes local memory 12-30 to perform a refresh operation and then return to the idle state.

Figure 5C:
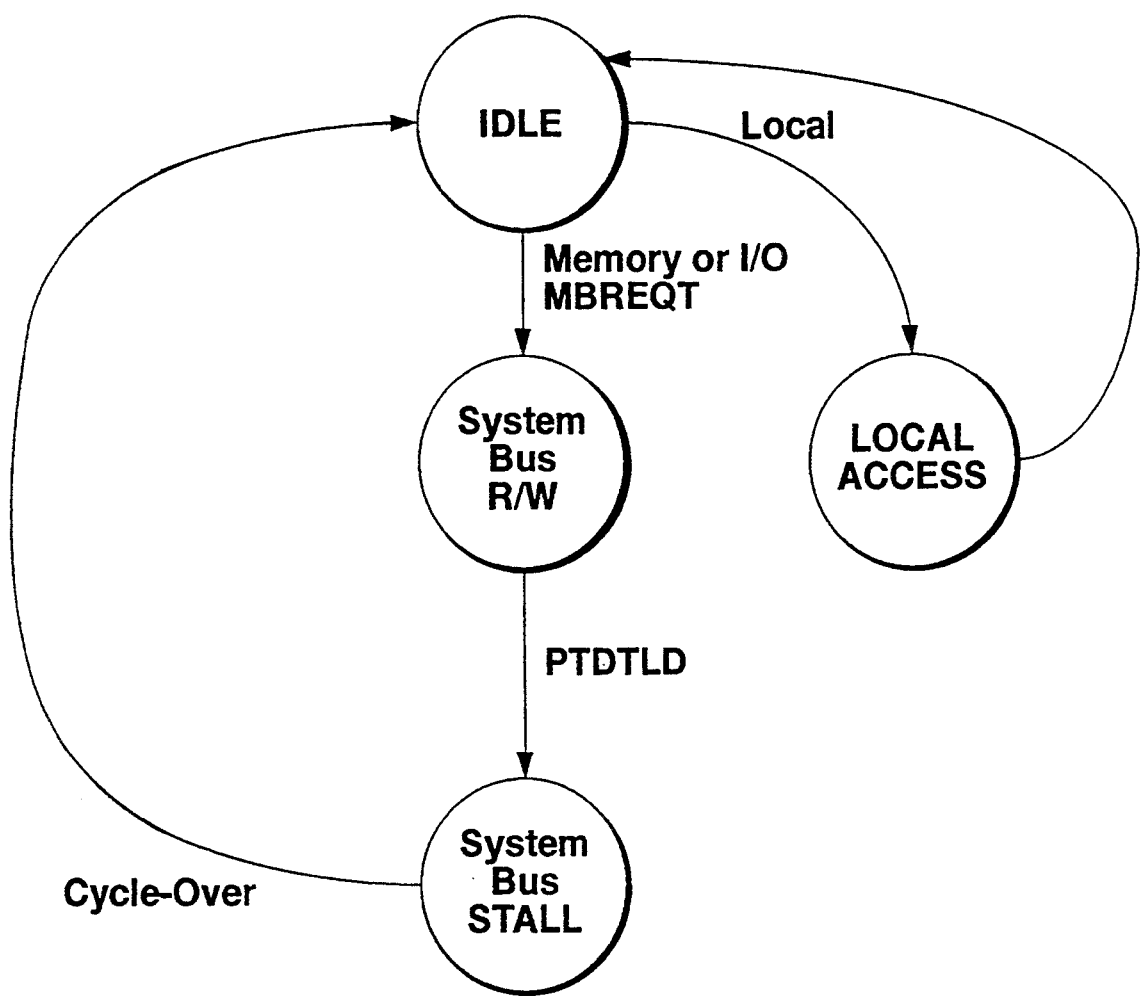

Description of FIG. 5c

FIG. 5c illustrates the overall operation of processor state machine (PSM) 12-80 which performs local and external memory accesses on behalf of microprocessor 12-20. As shown, PSM 12-80 starts in an idle state. In response to an external memory request or to an external I/O request from microprocessor 12-20, PSM 12-80 sequences to a system bus read/write state. When in this state, PSM 12-80 enables the transfer of the request to system bus 16 after which it sequences to a stall state. When there is a cycle over indication, PSM 12-80 returns to the idle state.

In response to request specifying a local access, such as memory read to a register or memory connected to the Q bus, the PSM sequences to a local access state. When in this state, PSM 12-80 generates the required signals for reading out the contents of the specified register or memory. Upon completing the read operation, PSM 12-80 returns to the idle state.

Figure 5D:
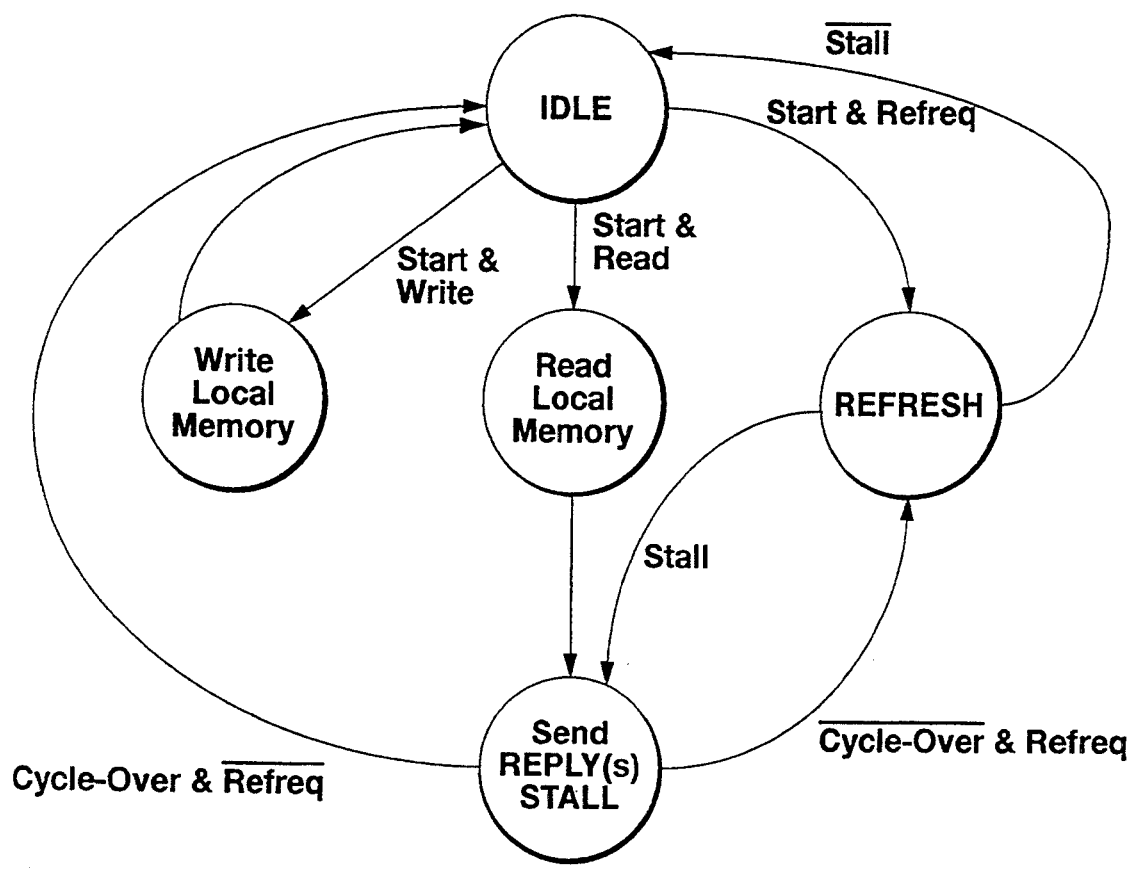

Description of FIG. 5d

FIG. 5d illustrates the overall operation of the external state machine (XSM) 12-66 in processing external read and write requests to local memory 12-30. As shown, XSM 12-66 starts in an idle state. In response to a read request and a start pulse, XSM 12-66 sequences to a read memory state. While in this state, it enables the transfer of the read request received from the system bus onto processor bus 12-25 for execution by local memory 12-30. The XSM 12-66 then sequences to a send reply state where it awaits completion of the read operation. Upon receipt of a cycle over indication, XSM 12-66 returns to the idle state. For a write request, XSM 12-66 sequences to a write state. While in this state, it transfers the system bus write request to processor bus 12-25 for execution by local memory 12-30. Upon such transfer, XSM 12-66 returns to the idle state. Additionally, XSM 12-66 also issues refresh requests to local memory 12-30. As shown in FIG. 5d, in response to a start pulse and refresh request indication, the XSM 12-66 sequences to a refresh state. While in this state, it transfers the request to local memory 12-30. In the absence of a stall condition, XSM 12-66 returns to the idle state.

From the above, it is seen that the state machines require access to processor local bus 12-25, in order to carry out their assigned tasks. The present invention enables the efficient time sharing of bus 12-25 in a manner which minimizes conflict and maintains high performance. This is achieved through the use of simple interfaces between state machines for applying control signals under certain conditions which minimizes conflicts as represented diagrammatically in FIG. 6.

Figure 6:
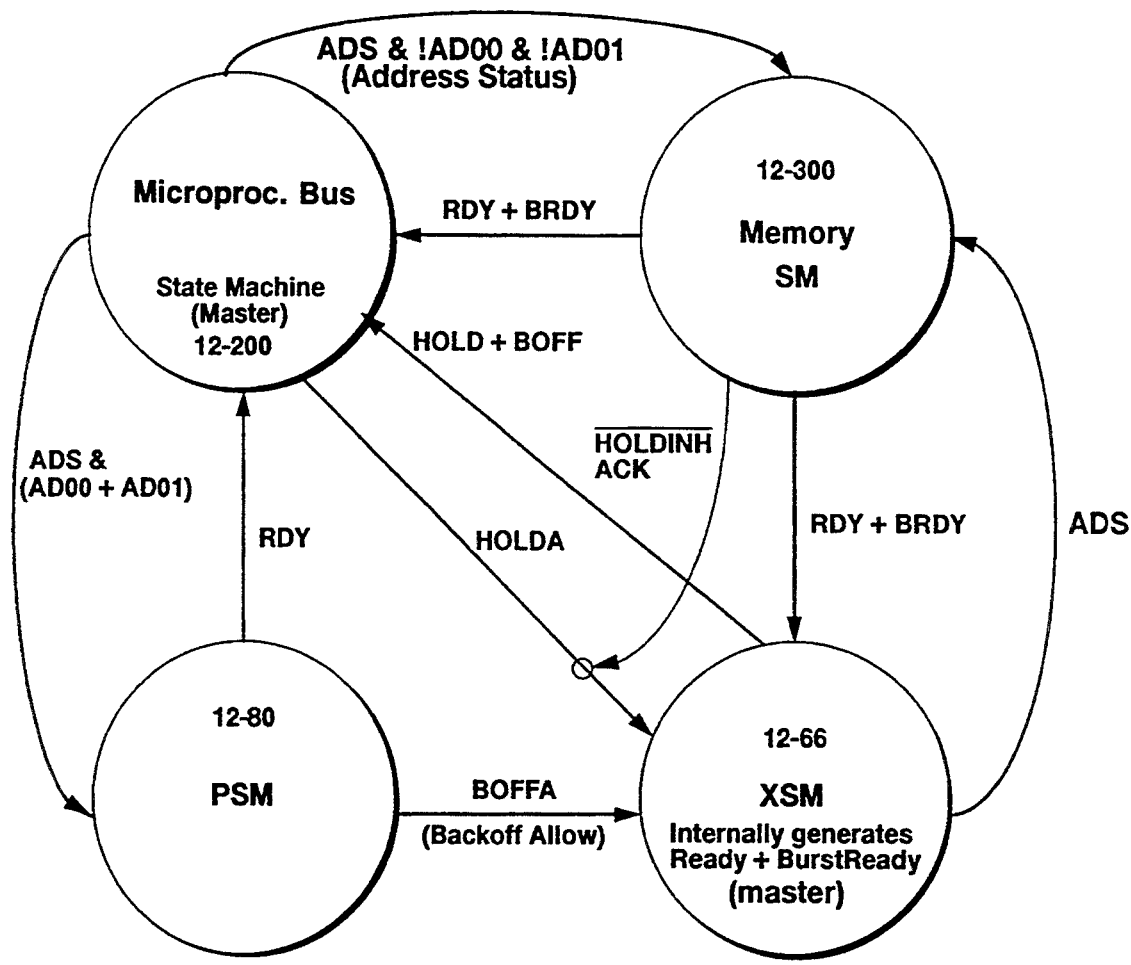
FIG. 6 is an overall state diagram illustrating the synchronized operation of the state machines of FIG. 2 in sharing the local bus of the processing unit of FIG. 1.

Description of FIG. 6

Referring to FIG. 6, it is seen that when the microprocessor bus state machine 12-200 receives a memory read or write request from microprocessor 12-20, it generates an address strobe (ADS). Since it is a local memory request, the high order address bits are ZEROS (!AD00 & !AD01). These signals are applied as inputs to the memory state machine (MSM) 12-66. The MSM 12-66 signals its return of valid data on processor local bus 12-25 in the case of a read, or signals its acceptance of data from the microprocessor 12-20 by signal RDY in the case of a non-burst transfer (i.e., signal DB-RDY-MM in FIG. 3b), or by signal BRDY in the case of a burst transfer (i.e., signal DB-BRDY in FIG. 3b). In such instances, microprocessor state machine 12-200 operates as a bus master while MSM 12-66 operates as a slave.

In a similar fashion, microprocessor bus state machine 12-200 accesses local bus 12-25 to issue external I/O requests to the system bus 16 received from microprocessor 12-20. As seen from FIG. 6, it also does this by generating an address strobe (ADS). Since this is an I/O operation, one of the address bits AD00 or AD01 will a binary ONE. This is due to the fact that all I/O request addresses are assigned values which are greater than one gigabyte.

As shown, the PSM 12-80 signals acceptance of the microprocessor request by generating ready signal RDY (i.e., signal QBRDY in FIG. 3c). Since PSM 12-80 is executing operations on behalf of microprocessor 12-20, there are no basic conflict situations relative to accessing local bus 12-25 as indicated in FIG. 6. However, this is not the case relative to the external state machine (XSM) 12-66.

As previously discussed, the normal way of seizing control of local bus 12-25 is by issuing a hold request (HOLD) and receiving back a hold acknowledge (HLDA). Another way of seizing control is to issue a backoff (BOFF). The only time that PSM 12-80 permits the XSM 12-66 to issue a backoff is when the PSM has issued an external request to the system bus on behalf of microprocessor 12-20 and is awaiting its completion. That is, when PSM 12-80 is in the system bus read/write state in FIG. 5c, at which point it no longer is using the local bus 12-25, it generates the backoff allow (i.e., signal MBBOFFA in FIG. 3c). This signal allows the XSM 12-66 to gain control of local bus 12-25 for accessing local memory 12-30.

In response to the backoff, the microprocessor bus state machine 12-200 immediately relinquishes control of local bus 12-20 as indicated in FIG. 6. As soon as the backoff is removed by the XSM, the bus state machine 12-200 retries or reissues the address strobe ADS which the PSM 12-80 ignores and instead delivers a ready RDY (i.e., signal QBRDY in FIG. 3c) to complete the operation. In this way, the state machine arrangement of the present invention is able to handle the system bus split cycle operation. Because of the short amount of time involved, the PSM 12-80 does not issue a backoff allow in the case of internal read/write requests to one of the registers such as, for example, an I/O read/write to the channel address register or physical address register. There the delivery of data, in response to a local register request, is completed without interruption.

Also, the XSM 12-66 also provides backoff signal QBBOFF as an input to the PSM 12-80 as shown. This ensures that the XSM 12-66 maintains control of local bus 12-25 in the event that PSM 12-80 requires bus access as, for example, to complete the delivery of data to the microprocessor 12-20 in response to an external memory (e.g. main memory) read request before XSM 12-66 can complete its operation.

In the preferred embodiment, the XSM 12-66 is able to operate as fast as possible to complete its memory operations. As soon as the XSM 12-66 receives a hold acknowledge signal from the bus state machine 12-200 indicating that it can gain control of local bus 12-25, it normally issues an address strobe ADS to memory state machine 12-300. However, in the case of back to back memory operations, the memory state machine 12-300 may be completing a memory request from microprocessor 12-20 in which case it requires several clock cycles before it can accept another memory request. In such cases, the memory state machine 12-300 in FIG. 3b issues a hold inhibit acknowledge signal (i.e., signal HLDAINH in FIG. 3b) which, in effect, prevents the microprocessor bus state machine 12-200 hold acknowledge signal from reaching the XSM 12-66 until the MSM 12-300 reaches the proper state where it can accept a request from the XSM 12-66. This operation is carried out by NAND gate 12-240d in FIG. 3a. In this way, MSM 12-300 is able to synchronize its operation at the end of a microprocessor bus cycle which is followed by an external memory access cycle. In issuing commands, XSM 12-66 operates as a master unit while MSM 12-300 operates as a slave unit.

When both the MSM and bus state machines provide the required acknowledgments, the XSM 12-66 issues an address strobe ADS which begins the bus cycle. The XSM 12-66 internally generates ready and burst ready signals and therefore does not require any further input signals to complete the operation.

The above has shown how the state machines of processor 12-2 operate in sharing a high performance synchronous local bus in a manner which facilitates the parallel processing of transactions.

It will be appreciated by those skilled in the art that many changes may be made without departing from the teachings of the present invention. For example, the invention may be used in conjunction with different types of protocols and commands. Also, while the preferred embodiment utilizes different PAL circuits to perform certain functions that such functions can be combined in certain instances and performed within a single circuit. Also, the invention is not limited to any specific type of circuit.

APPENDIX

I. MICROPROCESSOR BUS STATE MACHINE CIRCUITS - 12-24

Description of equation symbols:
(Where # = OR: ! = negation; and & = AND)

PAL Circuit 12-240c
MODULE XCD01

This PAL circuit controls address, control and data paths to/from the I486 P-bus (i.e., local bus 12-25) as described below:

!EDTPBS  - Always enables clocking of data from P-bus into register which drives Q-bus.

!EDTQTP  - Controls output enable allowing flow of data from Q-bus to P-bus.

!LDTQBS  - Always enables latching of data from Q-bus into latch which drives P-bus.

!EADQTP  - Controls output enable allowing flow of address and control from Q-bus to P-bus.

Pin Specifications:

(Inputs)

| | |
|---|---|
| REFCLK | PIN 1; |
| REFCLK1 | PIN 2; |
| QBHOLD | PIN 3; |
| LOCKHOLD | PIN 5; |
| DBHLDA | PIN 6; |
| !QB_RDY | PIN 7; |
| !QBBOFF | PIN 8; |
| DBWRRD | PIN 9; |
| DBMMIO | PIN 11; |
| PBAD31 | PIN 14; |
| PBAD30 | PIN 23; |

(Outputs)

| | | |
|---|---|---|
| EADQTPI | PIN 15; | " Only used internally |
| !EDTPBS | PIN 17; | |
| !EDTQTP | PIN 18; | |
| !LDTQBS | PIN 19; | |
| !QBBOFFD | PIN 20; | " Only used internally |
| !EADQTP | PIN 22; | |

EQUATIONS

QBBOFFD := QBBOFF;

EADQTP = EADQTPI;

```
EADQTPI = !REFCLK1 & DBHLDA & QBHOLD
        # !REFCLK1 & DBHLDA & LOCKHOLD
        # !REFCLK1 & QBBOFFD & QBBOFF
        # EADQTPI & QBHOLD
        # EADQTPI & LOCKHOLD
        # EADQTPI & QBBOFF;
  EDTQTP := DBHLDA & DBWRRD & QBHOLD
          # DBHLDA & DBWRRD & LOCKHOLD
```

```
    # QBBOFFD & DBWRRD & QBBOFF
    # !DBHLDA & !QBBOFFD & DBMMIO & !DBWRRD &
      PBAD31 & !QB_RDY
    # !DBHLDA & !QBBOFFD & DBMMIO & !DBWRRD &
      PBAD30 & !QB_RDY
    # !DBHLDA & !QBBOFFD & !DBMMIO & !DBWRRD & !QB
      RDY;
```

!LDTQBS := ^B1;

!EDTPBS := ^B0;

PAL Circuit 12-240b

MODULE XCD03

Pin Specifications:

(Inputs)

```
DBAHOLDIN     PIN 2;       "DBAHOLD+00
QBBOFFIN      PIN 6;       "QBBOFF-00
QBEADSIN      PIN 8;       "QBEADS-00
```

(Outputs)

```
DBEADSOUT     PIN 14;      "DBEADS-00
DBBOFFOUT     PIN 16;      "DBBOFF-00
DBAHOLDOUT    PIN 18;      "DBAHOLD+10
```

EQUATIONS

```
DBEADSOUT  = QBEADSIN ;
DBBOFFOUT  = QBBOFFIN ;
DBAHOLDOUT = DBAHOLDIN ;
```

PAL Circuit 12-240a

MODULE XCD06

Pin Specifications:

(Inputs)

| | | |
|---|---|---|
| QBHOLD | PIN 1; | "QBHOLD+00 |
| QB_RDY | PIN 3; | "QB-RDY-00 |
| DB_RDY_MM | PIN 4; | "DB-RDY-MM |
| DB_RDY_SP | PIN 5; | "DB-RDY-SP |
| DB_BRDYIN | PIN 8; | "DB-BRDY-00 |
| DBKENIN | PIN 9; | "DBKEN-00 |

(Outputs)

| | | |
|---|---|---|
| DB_BRDYOUT | PIN 14; | "DB_BRDY-10 |
| DB_RDY | PIN 15; | DB-RDY-00 |
| DBHOLD | PIN 19; | "DBHOLD+00 |

II. MEMORY STATE MACHINE 12-300

PAL Circuit 12-301b
MODULE XCD09

Pin Specifications:

(Inputs)

| | | |
|---|---|---|
| REFCLK | PIN 1; | "REFCLK+31 |
| DBCLR | PIN 2; | "DBCLR+00 |
| DBADS | PIN 3; | "DBADS+10 |
| REFRESH | PIN 4; | "REFRESH+00 |
| !DBWRRD | PIN 5; | "DBWRRD-10 |
| !DBBLAST | PIN 6; | "DBBLAST-00 |
| PBAD02 | PIN 7; | "PBAD02+10 |
| PBAD31 | PIN 8; | "PBAD31-10 |
| PBAD30 | PIN 9; | "PBAD30-10 |
| DBMMIO | PIN 10; | "DBMMIO-10 |

(Outputs)

| | | |
|---|---|---|
| !DB_RDY | PIN 16; | "DB-RDY-MM |

```
!ROWADD      PIN 17;     "ROWADD-00
!COLADD      PIN 18;     "COLADD-00
Q3,Q2,Q1,Q0  PIN 22,21,20,19; "State bits.

EQUATES:

STATE0 = ^HF;           STATE8 = ^HB;
STATE1 = ^H4;           STATE9 = ^H7;
STATE2 = ^HA;           STATEA = ^H9;
STATE3 = ^H8;           STATEB = ^H2;
STATE4 = ^HC;           STATEC = ^H0;
STATE5 = ^H6;           STATED = ^HD;
STATE6 = ^HE;           STATEE = ^H5;
STATE7 = ^H1;           STATEF = ^H3;

FALSE = 0;
TRUE  = 1;

MEMSEL = PBAD31 & PBAD30 & DBADS & !DBMMIO;
MEMACC = PBAD31 & PBAD30 & DBADS & !DBMMIO & !REFRESH;
REFACC = DBADS & REFRESH;
QSTATE = [Q3,Q2,Q1,Q0];
Actual logic equations.

EQUATIONS state_diagram QSTATE
State STATE0: "  Idle, waiting for a refresh or regular access.
        " Reset
        IF (DBCLR) THEN STATE0
                WITH    COLADD  := FALSE;
                        ROWADD  := TRUE;
                        DB_RDY  := FALSE;
                ENDWITH;
```

" No access or refresh.
IF (!MEMACC & !REFACC & !DBCLR) THEN STATE0
        WITH    COLADD  := FALSE;
                ROWADD  := TRUE;
                DB_RDY  := FALSE;
        ENDWITH;

" Refresh access.
IF (REFACC & !DBCLR) THEN STATE5
        WITH    COLADD  := FALSE;
                ROWADD  := TRUE;
                DB_RDY  := FALSE;
        ENDWITH;

" Regular access.
IF (MEMACC & !DBCLR) THEN STATEC
        WITH    COLADD  := FALSE;
                ROWADD  := TRUE;
                DB_RDY  := FALSE;
        ENDWITH;

State STATE1:   " Read access, first word returned to
                        microprocessor
" Reset.
IF (DBCLR) THEN STATE0
        WITH    COLADD  := FALSE;
                ROWADD  := TRUE;
                DB_RDY  := FALSE;
        ENDWITH;

" Blast not asserted.
IF (!DBCLR) THEN STATE 2
        WITH    COLADD  := TRUE;
                ROWADD  := FALSE;
                DB_RDY  := FALSE;
        ENDWITH;

State STATE2:   " Read access, second word returned to
                        microprocessor.

```
" Reset.
IF (DBCLR) THEN STATE0
        WITH    COLADD  := FALSE;
                ROWADD  := TRUE;
                DB_RDY  := FALSE;
        ENDWITH;

" Blast not asserted.
IF (!DBBLAST & !DBCLR) THEN STATE3
        WITH    COLADD  := TRUE;
                ROWADD  := FALSE;
                DB_RDY  := FALSE;
        ENDWITH;

" Blast asserted.
IF (DBBLAST & !DBCLR) THEN STATE4
        WITH    COLADD  := TRUE;
                ROWADD  := FALSE;
                DB_RDY  := FALSE;
        ENDWITH;

State STATE3:   " Read access
    " Reset.
    IF (DBCLR) THEN STATE0
        WITH    COLADD  := FALSE;
                ROWADD  := TRUE;
                DB_RDY  := FALSE;
        ENDWITH;

" Blast not asserted.
    IF (!DBCLR & !DBBLAST) THEN STATE0
        WITH    COLADD  := FALSE;
                ROWADD  := TRUE;
                DB_RDY  := FALSE;
        ENDWITH;

" Blast asserted.
    IF (!DBCLR & DBBLAST) THEN STATE6
        WITH    COLADD  := FALSE;
```

```
                              ROWADD    := TRUE;
                              DB_RDY    := FALSE;
               ENDWITH;

State STATEC:   " Access wait before asserting cas.

" Reset.
        IF (DBCLR) THEN STATE0
                WITH     COLADD    := FALSE;
                         ROWADD    := TRUE;
                         DB_RDY    := FALSE;
                ENDWITH;

IF (!DBCLR) THEN STATE8
                WITH     COLADD    := TRUE;
                         ROWADD    := FALSE;
                         DB_RDY    := FALSE;
                ENDWITH;

State STATE8:   " Assert CAS to go state depending on
                  write or read.

" Reset.
        IF (DBCLR) THEN STATE0
                WITH     COLADD    := FALSE;
                         ROWADD    := TRUE;
                         DB_RDY    := FALSE;
                ENDWITH;

" Read access.
        IF (!DBCLR & !DBWRRD) THEN STATEA
                WITH     COLADD    := TRUE;
                         ROWADD    := FALSE;
                         DB_RDY    := FALSE;
                ENDWITH;

" Write access.
        IF (!DBCLR & DBWRRD) THEN STATE7
                WITH     COLADD    := TRUE;
                         ROWADD    := FALSE;
```

```
                DB_RDY     := FALSE;
        ENDWITH;

State STATEA:

" Reset.
    IF (DBCLR) THEN STATE0
        WITH    COLADD    := FALSE;
                ROWADD    := TRUE;
                DB_RDY    := FALSE;
        ENDWITH;

" Multiple cycle transfer.
    IF (!DBCLR & !DBBLAST) THEN STATE1
        WITH    COLADD    := TRUE;
                ROWADD    := FALSE;
                DBY_RDY   := FALSE;
        ENDWITH;

" Single word transfer.
    IF (!DBCLR & DBBLAST) THEN STATE0
        WITH    COLADD    := FALSE;
                ROWADD    := TRUE;
                DB_RDY    := FALSE;
        ENDWITH;

State STATE7:   " First clock of WRITE access.

" Reset.
    IF (DBCLR) THEN STATE0
        WITH    COLADD    := FALSE;
                ROWADD    := TRUE;
                DB_RDY    := FALSE;
        ENDWITH;

IF (!DBCLR) THEN STATE0
        WITH    COLADD    := FALSE;
                ROWADD    := TRUE;
                DB_RDY    := TRUE;
        ENDWITH;
```

State STATE5: " A refresh with an open page.

" Reset.
IF (DBCLR) THEN STATE0
    WITH    COLADD  := FALSE;
            ROWADD  := TRUE;
            DB_RDY  := FALSE;
        ENDWITH;

IF (!DBCLR) THEN STATE9
    WITH    COLADD  := FALSE;
            ROWADD  := TRUE;
            DB_RDY  := FALSE;
        ENDWITH;

State STATE9: " 2nd clock with CAS low, for refresh.

" Reset.
IF (DBCLR) THEN STATE0
    WITH    COLADD  := FALSE;
            ROWADD  := TRUE;
            DB_RDY  := FALSE;
        ENDWITH;

IF (!DBCLR) THEN STATEE
    WITH    COLADD  := FALSE;
            ROWADD  := TRUE;
            DB_RDY  := TRUE;
        ENDWITH;

State STATE6: " Precharge RAS look for access.

" Reset.
IF (DBCLR) THEN STATE0
    WITH    COLADD  := FALSE;
            ROWADD  := TRUE;
            DB_RDY  := FALSE;
        ENDWITH;

```
" No access.
IF (!DBCLR & !MEMSEL) THEN STATE0
        WITH    COLADD  := FALSE;
                ROWADD  := TRUE;
                DB_RDY  := FALSE;
        ENDWITH;

" Access.
IF (!DBCLR & MEMSEL) THEN STATED
        WITH    COLADD  := FALSE;
                ROWADD  := TRUE;
                DB_RDY  := FALSE;
        ENDWITH;

State STATED:  " Precharge done do the access.

"Reset
IF (DBCLR) THEN STATE0
        WITH    COLADD  := FALSE;
                ROWADD  := TRUE;
                DB_RDY  := FALSE;
        ENDWITH;

" Refresh access.
IF (REFRESH & !DBCLR) THEN STATE0
        WITH    COLADD  := FALSE;
                ROWADD  := TRUE;
                DB_RDY  := FALSE;
        ENDWITH;

" Regular access.
IF (!REFRESH & !DBLCR) THEN STATEC
        WITH    COLADD  := FALSE;
                ROWADD  := TRUE;
                DB_RDY  := FALSE;
        ENDWITH;
```

State STATE4:

" Reset.
IF (DBCLR) THEN STATE0
        WITH    COLADD  := FALSE;
                ROWADD  := TRUE;
                DB_RDY  := FALSE;
            ENDWITH;

" No access.
IF (!DBCLR & !MEMSEL) THEN STATE 6
        WITH    COLADD  := FALSE;
                ROWADD  := TRUE;
                DB_RDY  := FALSE;
            ENDWITH;

" Access.
IF (!DBCLR & MEMSEL) THEN STATEB
        WITH    COLADD  := FALSE;
                ROWADD  := TRUE;
                DB_RDY  := FALSE;
            ENDWITH;

State STATEB:

" Reset.
IF (DBCLR) THEN STATE0
        WITH    COLADD  := FALSE;
                ROWADD  := TRUE;
                DB_RDY  := FALSE;
            ENDWITH;

IF (!DBCLR) THEN STATED
        WITH    COLADD  := FALSE;
                ROWADD  := TRUE;
                DB_RDY  := FALSE;
            ENDWITH;

State STATEE:

IF (DBCLR) THEN STATE0
        WITH    COLADD  := FALSE;
                ROWADD  := TRUE;
                DB_RDY  := FALSE;
        ENDWITH;
    IF (!DBCLR) THEN STATE4
        WITH    COLADD  := FALSE;
                ROWADD  := TRUE;
                DB_RDY  := FALSE;
        ENDWITH;

State STATEF:  " Unused state.
    GOTO STATE0
        WITH    COLADD  := FALSE;
                ROWADD  := TRUE;
                DB_RDY  := FALSE;
        ENDWITH;

PAL Circuit 12-301a

MODULE XCD12

Pin Specifications:
    (Inputs)

| | | |
|---|---|---|
| REFCLK | PIN 1; | "REFCLK+31 |
| DBCLR | PIN 2; | "DBCLR+00 |
| DBADS | PIN 3; | "DBADS+10 |
| REFRESH | PIN 4; | "REFRESH+00 |
| !DBWRRD | PIN 5; | "DBWRRD-10 |
| !DBBLAST | PIN 6; | "DBBLAST-00 |
| PBAD02 | PIN 7; | "PBAD02+10 |
| PBAD31 | PIN 8; | "PBAD31-10 |
| PBAD30 | PIN 9; | "PBAD30-10 |
| DBMMIO | PIN 10; | "DBMMIO-10 |

(Outputs)

```
!INVAD      PIN 15;   "INVCA0-00
!HLDAINH    PIN 16;   "HLDAINH-00
!DB_BRDY    PIN 17;   "DB-BRDY-00
!MEMWRT     PIN 18;   "MEMWRT-00
A3,Q2,Q1,Q0 PIN 22,21,209,19; "State bits.
```

EQUATES.

```
STATE0 = ^HF;        STATE8 = ^HB;
STATE1 = ^H4;        STATE9 = ^H7;
STATE2 = ^HA;        STATEA = ^H9;
STATE3 = ^H8;        STATEB = ^H2;
STATE4 = ^HC;        STATEC = ^H0;
STATE5 = ^H6;        STATED = ^HD;
STATE6 = ^HE;        STATEE = ^H5;
STATE7 = ^H1;        STATEF = ^H3;
```

FALSE = 0;
TRUE  = 1;

MEMSEL = PBAD31 & PBAD30 & DBADS & !DBMMIO;

QSTATE = [Q3,Q2,Q1,Q0];

"Actual logic equations.

EQUATIONS state_diagram QSTATE
State STATE0:   " Idle, waiting for a refresh or regular
                  access.

" Reset.
    IF (DBCLR) THEN STATE0
            WITH     INVAD    := FALSE;
                     HLDAINH  := FALSE;

```
                    DB_BRDY := FALSE;
                    MEMWRT  := FALSE;
        ENDWITH;

" No access or refresh.
IF (!MEMSEL & !DBCLR) THEN STATE0
        WITH    INVAD    := FALSE;
                HLDAINH  := FALSE;
                DB_BRDY  := FALSE;
                MEMWRT   := FALSE;
        ENDWITH;

" Refresh access.
IF (MEMSEL & REFRESH & !DBCLR) THEN STATE5
        WITH    INVAD    := FALSE;
                HLDAINH  := FALSE;
                DB_BRDY  := FALSE;
                MEMWRT   := FALSE;
        ENDWITH;

" Read access.
IF (MEMSEL & !DBWRRD & !REFRESH & !DBCLR) THEN
    STATEC
        WITH    INVAD    := FALSE;
                HLDAINH  := FALSE;
                DB_BRDY  := FALSE;
                MEMWRT   := FALSE;
        ENDWITH;

" Write access.
IF (MEMSEL & DBWRRD & !REFRESH & !DBCLR) THEN
    STATEC
        WITH    INVAD    := FALSE;
                HLDAINH  := FALSE;
                DB_BRDY  := FALSE;
                MEMWRT   := TRUE ;
        ENDWITH;

State STATE1:   " Read access, first word returned to
        486.
```

" Reset.
IF (DBCLR) THEN STATE0
        WITH    INVAD    := FALSE;
                HLDAINH  := FALSE;
                DB_BRDY  := FALSE;
                MEMWRT   := FALSE;
        ENDWITH;

" Even word returned.
IF (!PBAD02 & !DBCLR) THEN STATE2
        WITH    INVAD    := TRUE ;
                HLDAINH  := FALSE;
                DB_BRDY  := TRUE ;
                MEMWRT   := FALSE;
        ENDWITH;

" Odd word returned.
IF (PBAD02 & !DBCLR) THEN STATE2
        WITH    INVAD    := TRUE ;
                HLDAINH  := FALSE;
                DB_BRDY  := TRUE ;
                MEMWRT   := FALSE;
        ENDWITH;

State STATE2:   " Read access, second word returned to
                486.

" Reset.
IF (DBCLR) THEN STATE0
        WITH    INVAD    := FALSE;
                HLDAINH  := FALSE;
                DB_BRDY  := FALSE;
                MEMWRT   := FALSE;
        ENDWITH;

" Odd word returned, blast unasserted.
IF (!PBAD02 & !DBCLR & !DBBLAST) THEN STATE 3
        WITH    INVAD    := TRUE ;
                HLDAINH  := FALSE;
                DB_BRDY  := TRUE ;

```
                    MEMWRT    := FALSE;
        ENDWITH;

" Even word returned, blast unasserted.
    IF (PBAD02 & !DBCLR & !DBBLAST) THEN STATE3
            WITH    INVAD    := TRUE ;
                    HLDAINH  := FALSE;
                    DB_BRDY  := TRUE ;
                    MEMWRT   := FALSE;
        ENDWITH;

" Blast asserted.
    IF (DBBLAST) THEN STATE4
            WITH    INVAD    := TRUE ;
                    HLDAINH  := TRUE ;
                    DB_BRDY  := FALSE;
                    MEMWRT   := FALSE;
        ENDWITH;

State STATE3:   " Read access.

" Reset.
    IF (DBCLR) THEN STATE0
            WITH    INVAD    := FALSE;
                    HLDAINH  := FALSE;
                    DB_BRDY  := FALSE;
                    MEMWRT   := FALSE;
        ENDWITH;

" Blast unasserted.
    IF (!DBCLR & !DBBLAST & !PBAD02) THEN STATE0
            WITH    INVAD    := FALSE;
                    HLDAINH  := FALSE;
                    DB_BRDY  := TRUE ;
                    MEMWRT   := FALSE;
        ENDWITH;

" Blast unasserted, 2nd odd word returned.
    IF (!DBCLR & !DBBLAST & PBAD02) THEN STATE0
```

```
            WITH    INVAD    := FALSE;
                    HLDAINH  := FALSE;
                    DB_BRDY  := TRUE ;
                    MEMWRT   := FALSE;
            ENDWITH;

" Blast asserted, 2nd even word returned.
    IF (!DBCLR & DBBLAST & !PBAD02) THEN STATE6
            WITH    INVAD    := FALSE;
                    HLDAINH  := FALSE;
                    DB_BRDY  := FALSE;
                    MEMWRT   := FALSE;
            ENDWITH;

" Blast asserted, 2nd odd word returned.
    IF (!DBCLR & DBBLAST & PBAD02) THEN STATE6
            WITH    INVAD    := FALSE;
                    HLDAINH  := FALSE;
                    DB_BRDY  := FALSE;
                    MEMWRT   := FALSE;
            ENDWITH;

State STATEC:   " Normal access, wait before asserting
                  cas.

" Reset.
    IF (DBCLR) THEN STATE0
            WITH    INVAD    := FALSE;
                    HLDAINH  := FALSE;
                    DB_BRDY  := FALSE;
                    MEMWRT   := FALSE;
            ENDWITH;

IF (!DBCLR & !DBWRRD) THEN STATE8
            WITH    INVAD    := FALSE;
                    HLDAINH  := FALSE;
                    DB_BRDY  := FALSE;
                    MEMWRT   := FALSE;
            ENDWITH;
```

```
        IF (!DBCLR & DBWRRD) THEN STATE8
                WITH    INVAD    := FALSE;
                        HLDAINH  := FALSE;
                        DB_BRDY  := FALSE;
                        MEMWRT   := TRUE ;
                ENDWITH;

State STATE8:   " Assert CAS go to state depending on
                write or read.

" Reset.
        IF (DBCLR) THEN STATE0
                WITH    INVAD    := FALSE;
                        HLDAINH  := FALSE;
                        DB_BRDY  := FALSE;
                        MEMWRT   := FALSE;
                ENDWITH;

" Read access.
        IF (!DBCLR & !DBWRRD) THEN STATEA
                WITH    INVAD    := FALSE;
                        HLDAINH  := FALSE;
                        DB_BRDY  := FALSE;
                        MEMWRT   := FALSE;
                ENDWITH;

" Write access.  Assert MEMWRT.
        IF (!DBCLR & DBWRRD) THEN STATE7
                WITH    INVAD    := FALSE;
                        HLDAINH  := FALSE;
                        DB_BRDY  := FALSE;
                        MEMWRT   := TRUE ;
                ENDWITH;

State STATEA:   " Even and odd cas asserted one clock,
                read access.

" Reset.
        IF (DBCLR) THEN STATE0
                WITH    INVAD    := FALSE;
```

```
                HLDAINH   := FALSE;
                DB_BRDY   := FALSE;
                MEMWRT    := FALSE;
        ENDWITH;

" Blast not asserted, multiple transfer.
IF (!DBCLR & !DBBLAST & !PBAD02) THEN STATE1
        WITH    INVAD     := TRUE ;
                HLDAINH   := FALSE;
                DB_BRDY   := TRUE ;
                MEMWRT    := FALSE;
        ENDWITH;

" Blast not asserted, multiple transfer.
IF (!DBCLR & !DBBLAST & PBAD02) THEN STATE1
        WITH    INVAD     := TRUE ;
                HLDAINH   := FALSE;
                DB_BRDY   := TRUE ;
                MEMWRT    := FALSE;
        ENDWITH;

" Blast asserted, single even word transfer.
IF (!DBCLR & DBBLAST & !PBAD02) THEN STATE0
        WITH    INVAD     := FALSE;
                HLDAINH   := FALSE;
                DB_BRDY   := TRUE ;
                MEMWRT    := FALSE;
        ENDWITH;

" Blast asserted, single odd transfer.
IF (!DBCLR & DBBLAST & PBAD02) THEN STATE0
        WITH    INVAD     := FALSE;
                HLDAINH   := FALSE;
                DB_BRDY   := TRUE ;
                MEMWRT    := FALSE;
        ENDWITH;

State STATE7:   " Write access.  Even and odd cas
                  asserted one clock.
```

```
" Reset.
IF (DBCLR) THEN STATE0
        WITH    INVAD    := FALSE;
                HLDAINH  := FALSE;
                DB_BRDY  := FALSE;
                MEMWRT   := FALSE;
        ENDWITH;

" Unassert MEMWRT.
IF (!DBCLR) THEN STATE0
        WITH    INVAD    := FALSE;
                HLDAINH  := FALSE;
                DB_BRDY  := FALSE;
                MEMWRT   := FALSE;
        ENDWITH;

State STATE5:   " Refresh access, even and odd cas
                  asserted one clock.

" Reset.
IF (DBCLR) THEN STATE0
        WITH    INVAD    := FALSE;
                HLDAINH  := FALSE;
                DB_BRDY  := FALSE;
                MEMWRT   := FALSE;
        ENDWITH;

" Keep even and odd cas asserted.
IF (!DBCLR) THEN STATE9
        WITH    INVAD    := FALSE;
                HLDAINH  := FALSE;
                DB_BRDY  := FALSE;
                MEMWRT   := FALSE;
        ENDWITH;

State STATE9:   " Refresh access, even and odd cas
                  asserted two clocks.

" Reset.
IF (DBCLR) THEN STATE0
```

```
                WITH    INVAD    := FALSE;
                        HLDAINH  := FALSE;
                        DB_BRDY  := FALSE;
                        MEMWRT   := FALSE;
                ENDWITH;

" Keep even and odd cas asserted
        IF (!DBCLR) THEN STATEE
                WITH    INVAD    := FALSE;
                        HLDAINH  := FALSE;
                        DB_BRDY  := FALSE;
                        MEMWRT   := FALSE;
                ENDWITH;

State STATE6:   " Precharge RAS look for access.
        " Reset.
        IF (DBCLR) THEN STATE0
                WITH    INVAD    := FALSE;
                        HLDAINH  := FALSE;
                        DB_BRDY  := FALSE;
                        MEMWRT   := FALSE;
                ENDWITH;

" No access.
        IF (!DBCLR & !MEMSEL) THEN STATE0
                WITH    INVAD    := FALSE;
                        HLDAINH  := FALSE;
                        DB_BRDY  := FALSE;
                        MEMWRT   := FALSE;
                ENDWITH;

" Access.
        IF (!DBCLR & MEMSEL) THEN STATED
                WITH    INVAD    := FALSE;
                        HLDAINH  := FALSE;
                        DB_BRDY  := FALSE;
                        MEMWRT   := FALSE;
                ENDWITH;
```

State STATED:   " Precharge over.  Start next access.

" Reset.
   IF (DBCLR) THEN STATE0
        WITH    INVAD    := FALSE;
                HLDAINH  := FALSE;
                DB_BRDY  := FALSE;
                MEMWRT   := FALSE;
        ENDWITH;

" Refresh access.
   IF (REFRESH & !DBCLR) THEN STATE0
        WITH    INVAD    := FALSE;
                HLDAINH  := FALSE;
                DB_BRDY  := FALSE;
                MEMWRT   := FALSE;
        ENDWITH;

" Regular access.
   IF (!REFRESH & !DBCLR) THEN STATEC
        WITH    INVAD    := FALSE;
                HLDAINH  := FALSE;
                DB_BRDY  := FALSE;
                MEMWRT   := FALSE;
        ENDWITH;

State STATE4:   " Precharge RAS look for access.

" Reset.
   IF (DBCLR) THEN STATE0
        WITH    INVAD    := FALSE;
                HLDAINH  := FALSE;
                DB_BRDY  := FALSE;
                MEMWRT   := FALSE;
        ENDWITH;

" No access.
   IF (!DBCLR & !MEMSEL) THEN STATE6
        WITH    INVAD    := FALSE;

```
                HLDAINH := FALSE;
                DB_BRDY := FALSE;
                MEMWRT  := FALSE;
        ENDWITH;

" Access.
IF (!DBCLR & MEMSEL) THEN STATEB
        WITH    INVAD   := FALSE;
                HLDAINH := FALSE;
                DB_BRDY := FALSE;
                MEMWRT  := FALSE;
        ENDWITH;

State STATEB:

" Reset.
IF (DBCLR) THEN STATE0
        WITH    INVAD   := FALSE;
                HLDAINH := FALSE;
                DB_BRDY := FALSE;
                MEMWRT  := FALSE;
        ENDWITH;

" No access.
IF (!DBCLR) THEN STATED
        WITH    INVAD   := FALSE;
                HLDAINH := FALSE;
                DB_BRDY := FALSE;
                MEMWRT  := FALSE;
        ENDWITH;

State STATEE:

IF (DBCLR) THEN STATE0
        WITH    INVAD   := FALSE;
                HLDAINH := FALSE;
                DB_BRDY := FALSE;
                MEMWRT  := FALSE;
        ENDWITH;
```

```
        IF (!DBCLR) THEN STATE4
                WITH    INVAD   := FALSE;
                        HLDAINH := FALSE;
                        DB_BRDY := FALSE;
                        MEMWRT  := FALSE;
                ENDWITH;

State STATEF:  " Unused state.

GOTO STATE0
                WITH    INVAD   := FALSE;
                        HLDAINH := FALSE;
                        DB_BRDY := FALSE;
                        MEMWRT  := FALSE;
                ENDWITH;
```

III. PROCESSOR STATE MACHINE 12-80

PAL Circuit 12-800a
MODULE XCM38

Pin Specifications:
(Inputs)

```
  MBMCLR        PIN  2;   " MASTER CLEAR
  ADS           PIN  3;   " HOT SIGNAL
  !AD00         PIN  4;   "
  !AD01         PIN  5;   "
  !AD16         PIN  6;   "
  !MMIO         PIN  7;   "
  !DTCN         PIN  8;   "
  !WRRD         PIN  9;   "
  !RDY          PIN 10;   " FROM MOTHER BOARD PALS
  !PARLD        PIN 11;   "
```

(Outputs)

```
WRCMD       PIN 15;
DCCMD       PIN 16;
MIOCMD      PIN 17;
!Q0         PIN 18;
!CPREEP     PIN 19;
!CARREQ     PIN 20;
!INTREQ     PIN 21;
!MBREQT     PIN 22;

CMD = [MMIO,DTCN,WRRD];

EQUATIONS

MIOCMD   := PARLD & MMIO #
            MIOCMD & !PARLD;

DCCMD    := PARLD & DTCN #
            DCCMD & !PARLD;

WRCMD    := PARLD & WRRD #
            WRCMD & !PARLD;

" read to non-private memory
CPREEP   := (!MBMCLR & ADS & AD00 & AD01 & ((CMD == 6) #
            (CMD == 4) # (CMD == 7)))
            (!MBMCLR & CPREEP & !RDY);

" read to system bus or i/o access to system
           bus

MBREQT   := (!MBMCLR & ADS & (AD00 $ AD01) & ((CMD == 6)
            # (CMD == 7))) # (!MBMCLR & ADS & AD16 &
            ((CMD == 3) # (CMD == 2))) # (!MBMCLR &
            MBREQT & !RDY);

"  internal interrupt or i/o cycle
```

```
INTREQ   := (!MBMCLR & ADS & !AD16 & ((CMD == 0) #
         (CMD == 2) # (CMD == 3))) # (!MBMCLR &
         INTREQ & !RDY);

"  request car

CARREQ   := (!MBMCLR & ADS & !AD16 & ((CMD == 2) #
         (CMD == 3))) # (!MBMCLR & CARREQ & !RDY);
```

PAL Circuit 12-800d

MODULE XCM39

Pin Specifications:

(Inputs)

| | |
|---|---|
| REFCLK | PIN 1; |
| MBMCLR | PIN 2; |
| !CARREQ | PIN 4; |
| !HOTWR | PIN 5; |
| QBAD17 | PIN 6; |
| QBAD18 | PIN 7; |

(Outputs)

| | |
|---|---|
| Q3 | PIN 14; |
| Q2 | PIN 15; |
| Q1 | PIN 16; |
| Q0 | PIN 17; |
| !CARLD | PIN 20; |
| !CARREAD | PIN 21; |
| !PARREAD | PIN 22; |

EQUATES

QSTATE = [Q3,Q2,Q1,Q0];

STATE_0 = ^H 0;      STATE_8 = ^H 8;

| | |
|---|---|
| STATE_1 = ^H 1; | STATE_9 = ^H 9; |
| STATE_2 = ^H 2; | STATE_A = ^H A; |
| STATE_3 = ^H 3; | STATE_B = ^H B; |
| STATE_4 = ^H 4; | STATE_C = ^H C; |
| STATE_5 = ^H 5; | STATE_D = ^H D; |
| STATE_6 = ^H 6; | STATE_E = ^H E; |
| STATE_7 = ^H 7; | STATE_F = ^H F; |

EQUATIONS

```
CARLD: = !MBMCLR & CARREQ & !CPREEP & HOTWR & QBAD17 &
            !QBAD18 & (QSTATE == STATE_0) #
        !MBMCLR & CARLD & (QSTATE == STATE_1) #
        !MBMCLR & CARLD & (QSTATE == STATE_2);

CARREAD : = !MBMCLR & CARREQ & !CPREEP & !HOTWR &
              QBAD17 & !QBAD18 & (QSTATE == STATE_0) #
          !MBMCLR & CARREAD & (QSTATE == STATE_1) #
          !MBMCLR & CARREAD & (QSTATE == STATE_2);
PARREAD : = !MBMCLR & CARREQ & !CPREEP & !HOTWR &
              QBAD17 & QBAD18 & (QSTATE == STATE_0) #
          !MBMCLR & PARREAD & (QSTATE == STATE_1) #
          !MBMCLR & PARREAD & (QSTATE == STATE_2) #
          !MBMCLR & PARREAD & (QSTATE == STATE_3) #
          !MBMCLR & PARREAD & (QSTATE == STATE_4) #
          !MBMCLR & PARREAD & (QSTATE == STATE_5) #
          !MBMCLR & PARREAD & (QSTATE == STATE_6) #
          !MBMCLR & PARREAD & (QSTATE == STATE_7) #
          !MBMCLR & PARREAD & (QSTATE == STATE_8);

STATE_DIAGRAM QSTATE
STATE STATE_0
     IF (!MBMCLR & (CPREEP # CARREQ)) THEN STATE_1
     ELSE STATE_0;

STATE STATE_1:
     IF (!MBMCLR) THEN STATE_2
     ELSE STATE_0;
```

```
STATE STATE_2:
    IF (!MBMCLR) THEN STATE_3
    ELSE STATE_0;

STATE STATE_3:
    IF (!MBMCLR & (CPREEP # PARREAD)) THEN STATE_4
    ELSE STATE_0;

STATE STATE_4:
    IF (!MBMCLR) THEN STATE_5
    ELSE STATE_0;

STATE STATE_5:
    IF (!MBMCLR) THEN STATE_6
    ELSE STATE_0;

STATE STATE_6:
    IF (!MBMCLR) THEN STATE_7
    ELSE STATE_0;

STATE STATE_7:
    IF (!MBMCLR) THEN STATE_8
    ELSE STATE_0;

STATE STATE_8:
    IF (!MBMCLR) THEN STATE_9
    ELSE STATE_0;

STATE STATE_9:
    GOTO STATE_0;
```

PAL Circuit 12-800b

MODULE XCM40

Pin Specifications:
   (Inputs)

REFCLK         PIN 1;

| | |
|---|---|
| MBMCLR | PIN 2; |
| !MBREQT | PIN 3; |
| PTCYCLO | PIN 4; |
| !QBBOFF | PIN 5; |
| !HOTWR | PIN 6; |
| !HOTMIO | PIN 7; |
| OPTMOT | PIN 8; |
| MBT2CK | PIN 9; |

(Outputs)

| | |
|---|---|
| !PTDTLD | PIN 22; |
| MBBOFFA | PIN 21; |
| PTWRRD | PIN 20; |
| PTMIO | PIN 19; |
| !PTSHEN | PIN 18; |
| !MB_RDY | PIN 17; |
| Q0 | PIN 16; |
| Q1 | PIN 15; |
| Q2 | PIN 15; |

EQUATES

S_REG = [Q2,Q1,Q0];
STATE_0 = ^B000;
STATE_1 = ^B001;
STATE_2 = ^B010;
STATE_3 = ^B011;
STATE_4 = ^B100;
STATE_5 = ^B101;
STATE_6 = ^B110;
STATE_7 = ^B111;

End of State Machine Definitions

EQUATIONS

PTDTLD : = (S_REG == STATE_1) & MBREQT & !MBMCLR;
MBBOFFA: = (S_REG == STATE_1) #

```
                  (S_REG == STATE_2) & !PTCYCLO;
PTWRRD  : = (S_REG == STATE_1) & MBREQT & HOTWR #
            PTWRRD & !(S_REG == STATE_0);
PTMIO   : = (S_REG == STATE_1) & MBREQT & HOTMIO #
            PTMIO & !(S_REG == STATE_0);
PTSHEN  : = MBREQT & !PTWRRD & (S_REG == STATE_4) #
            MBREQT & !PTWRRD & (S_REG == STATE_5) #
            MBREQT & !HOTWR & ((S_REG == STATE_0) #
                (S_REG == STATE_1))
              & !MBMCLR #
            MBT2CK & !HOTWR & (S_REG == STATE_5);
MB_RDY  : = (S_REG == STATE_4) #
            MBT2CK & !MBMCLR & (S_REG == STATE_0);
```

State Machine Equations:

STATE_DIAGRAM S_REG

STATE STATE_0:          "WAITING FOR A SYSTEM BUS REQUEST
    IF MBMCLR THEN STATE_0
    ELSE
       IF (!MBMCLR & !MBREQT & !MBT2CK) THEN STATE_0
    ELSE
       IF (!MBMCLR 7 MBREQT) THEN STATE_1
    ELSE
       IF (!MBMCLR & MBT2CK) THEN STATE_5;

STATE STATE_1:          "REQUEST STATE
    IF MBMCLR THEN STATE_0
    ELSE STATE_2;

STATE STATE_2:          "WAITING FOR CYCLE OVER
    IF MBMCLR THEN STATE_0
    ELSE
       IF (!MBMCLR & !OPTMOT & !PTCYCLO) THEN STATE_2
    ELSE
       IF (!MBMCLR & (PTCYCLO # OPTMOT)) THEN STATE_3;

STATE STATE_3:          "WAITING FOR BACKOFF
    IF MBMCLR THEN STATE_0
    ELSE

```
        IF (!MBMCLR & QBBOFF) THEN STATE_3
    ELSE
        IF (!MBMCLR & !QBBOFF) THEN STATE_4;

STATE STATE_4:
    IF MBMCLR THEN STATE_0 ELSE STATE_5;

STATE STATE_5:
    IF MBMCLER THEN STATE_0 ELSE STATE_6;

STATE STATE_6:          "UNUSED STATE
    GOTO STATE_0;

STATE STATE_7:          "UNUSED STATE
    GOTO STATE_0;
```

PAL Circuit 12-800c
MODULE XCM41

Pin Specifications:
(Inputs)

```
REFCLK        PIN 1;
RXHAVE        PIN 2;
!MBMRDY       PIN 3;
RXMREF        PIN 8;
RXSHBC        PIN 9;
RXPTWON       PIN 10;
FC00R31       PIN 13;
RXDT13        PIN 15;
RXDT14        PIN 16;
MBMCLR        PIN 17;
FCODE1        PIN 19;
RXNAKR        PIN 20;
```

(Outputs)

```
!QBMRDY0      PIN 22;
```

!QBMRDY1     PIN 21;
REDMODE      PIN 18;

EQUATIONS

QBMRDY0 : = MBMRDY # IAKRDY # INTRDY;

QBMRDY1 : = MBMRDY # IAKRDY # INTRDY;

REDMODE : = !MBMCLR & RXHAVE & FCODE1 & RXDT13 #
            REDMODE & !MBMCLR;

IV. EXTERNAL STATE MACHINE 12-66

PAL Circuit 12-660a

MODULE XCM09

This PAL generates the HOLD and BACKOFF signals.

Pin Specifications:

(Inputs)

| | |
|---|---|
| REFCLK | PIN 1; |
| RXHAVE | PIN 2; |
| XINIDLE | PIN 3; |
| XTR1BSY | PIN 4; |
| XTR2BSY | PIN 5; |
| RXMEMA | PIN 6; |
| RXCNCL | PIN 7; |
| RXIORWA | PIN 8; |
| REFREQT | PIN 10; |
| XINSTALL | PIN 11; |
| XSMCOVR | PIN 13; |
| HOLDCLR | PIN 14; |
| MBMCLR | PIN 15; |
| MBBOFFA | PIN 16; |

(Outputs)

QBBOFFD      PIN 21;

```
!QBBOFF1      PIN 20;
!QBBOFF0      PIN 19;
QBHOLD        PIN 18;

EQUATES:

EQUATIONS

QBHOLD   : = RXHAVE & XINIDLE & !XTR1BSY & !XTR2BSY &
             (RXMEMA & !RXCNCL # RXIORWA & RXEERW) #
               "MEMORY CYCLE
             XINIDLE & REFREQT #
             XINIDLE & XTR1BSY #
             XINIDLE & XTR2BSY #
             XINSTALL & REFREQT & !XSMCOVR #
             QBHOLD & !(HOLDCLR # MBMCLR);

QBBOFF1  : = MBBOFFA & ((RXHAVE & XINIDLE & !XTR1BSY &
             !XTR2BSY & (RXMEMA & !RXCNCL # RXIORWA &
             RXEERW)) #
             XINIDLE & XTR1BSY #
             XINIDLE & XTR2BSY #
             XINIDLE & REFREQT #
             XINSTALL & REFREQT & !XSMCOVR) #
             QBBOFF1 & !(HOLDCLR # MBMCLR);

QBBOFF0  : = MBBOFFA & ((RXHAVE & XINIDLE & !XTR1BSY &
             XTR2BSY & (RXMEMA & !RXCNCL # RXIORWA &
             RXEERW)) #
             XINIDLE & XTR1BSY #
             XINIDLE & XTR2BSY #
             XINIDLE & REFREQT #
             XINSTALL & REFREQT & !XSMCOVR) #
             QBBOFF0 & !(HOLDCLR # MBMCLR);

QBBOFFD  : = QBBOFF1;
```

PAL Circuit 12-660b

MODULE XCM46

Pin Specifications:

(Inputs)

| | | |
|---|---|---|
| REFCLK | PIN | 1; |
| XSMCOVR | PIN | 2; |
| !HOTHLDA | PIN | 3; |
| QBOFFD | PIN | 4; |
| !HOTWR | PIN | 5; |
| X1NEXT | PIN | 7; |
| XBWRIT | PIN | 8; |
| XINIDLE | PIN | 9; |
| QBHOLD | PIN | 10; |
| XINSTAL | PIN | 11; |
| REFREQT | PIN | 14; |

(Outputs)

| | | |
|---|---|---|
| !HOLDACK | PIN | 15; |
| !XSMSTRT | PIN | 16; |
| !X2DTEN | PIN | 18; |
| !EDTPTQ | PIN | 19; |
| !X1DTEN | PIN | 20; |
| !QBADS | PIN | 21; |
| !QBEADS | PIN | 22; |

EQUATIONS

```
EDTPTQ  : =  !HOTHLDA & !QBOFFD & HOTWR
           #    HOTHLDA & !XBEEPRM & !XBWRIT
           #    QBOFFD & !XBEEPRM & !XBWRIT;

X1DTEN  : =  HOTHLDA & X1NEXT & XBWRIT
           #    QBOFFD & x1NEXT & XBWRIT;
```

```
X2DTEN  : =   HOTHLDA & !X1NEXT & XBWRIT
            #   QBOFFD & !X1NEXT & XBWRIT;

QBEADS  : =   XINIDLE & (QBOFFD # HOTHLDA & QBHOLD)
            & !XBEEPRM & XBWRIT & !REFREQT & !QBEADS;

QBADS   : =   XINIDLE & (QBOFFD #  HOTHLDA  & QBHOLD) &
              !XBEEPRM  &  !QBADS  #  XINSTAL  & (QBOFFD #
              HOTHLDA  &  QBHOLD)  &  !XSMCOVR & REFREQT &
              !QBADS;

XSMSTRT : =   XINIDLE & (QBOFFD # HOTHLDA & QBHOLD);

HOLDACK : =   HOTHLDA;
```

PAL Circuit 12-660c

MODULE XCM48

Pin Specifications:
(Inputs)

| | | |
|---|---|---|
| REFCLK | PIN 1; | |
| MBMCLR | PIN 2; | |
| !XSMSTRT | PIN 3; | |
| REFREQT | PIN 4; | |
| XSMCOVR | PIN 5; | |
| "REFCLK | PIN 6; | for proper loading |
| REFRESH | PIN 9; | |
| XSMSTOP | PIN 10; | |
| XSMSTAL | PIN 11; | |

(Outputs)

| | |
|---|---|
| XSMCSA | PIN 21; |
| XSMCSB | PIN 20; |
| XSMCSC | PIN 17; |

| | |
|---|---|
| XSMCSD | PIN 18; |
| XSMCSE | PIN 19; |
| XINSTAL | PIN 14; |
| XINIDLE | PIN 23; |

EQUATES:

S_REG = [XSMCSA,XSMCSB,XSMCSC,XSMCSD,XSMCSE];

State Machine State Definitions

| | | |
|---|---|---|
| idle   | = | ^B00000; |
| stall  | = | ^B00001; |
| SETA_a | = | ^B00010; |
| SETA_b | = | ^B00011; |
| SETA_c | = | ^B00100; |
| SETA_d | = | ^B00101; |
| SETA_e | = | ^B00110; |
| SETA_f | = | ^B00111; |
| SETA_g | = | ^B01000; |
| SETA_h | = | ^B01001; |
| SETA_i | = | ^B01010; |
| SETA_j | = | ^B01011; |
| SETA_k | = | ^B01100; |
| SETA_l | = | ^B01101; |
| SETA_m | = | ^B01110; |
| close  | = | ^B01111; |
| SETB_a | = | ^B10000; |
| SETB_b | = | ^B10100; |
| SETB_c | = | ^B11000; |
| SETB_d | = | ^B11100; |

End of State Machine State Definitions

EQUATIONS

XINSTAL : = XSMSTAL & !MBMCLR
　　　　　# (S_REG==stall) & !XSMCOVR & !REFRESH &

!MBMCLR;

XINIDLE : = XSMSTOP # MBMCLR
         # (S_REG==idle) & !XSMSTRT;

State Machine Equations:

STATE_DIAGRAM S_REG

STATE idle:
IF MBMCLR
THEN idle
ELSE
IF XSMSTRT
THEN SETA_a
ELSE idle;

STATE stall:
IF MBMCLR
THEN idle
ELSE
IF REFRESH
THEN SETB_a
ELSE
IF XSMCOVR
THEN SETA_k
ELSE stall;

STATE close:
IF MBMCLR # XSMSTOP
THEN idle
ELSE close;

STATE SETA_a:
IF MBMCLR # XSMSTOP
THEN idle
ELSE
IF XSMSTAL

```
THEN stall
ELSE SETA_b;

STATE SETA_b:
IF MBMCLR # XSMSTOP
THEN idle
ELSE
IF XSMSTAL
THEN stall
ELSE SETA_c;

STATE SETA_c:
IF MBMCLR # XSMSTOP
THEN idle
ELSE
IF XSMSTAL
THEN stall
ELSE SETA_d;

STATE SETA_d:
IF MBMCLR # XSMSTOP
THEN idle
ELSE
IF XSMSTAL
THEN stall
ELSE SETA_e;

STATE SETA_e:
IF MBMCLR # XSMSTOP
THEN idle
ELSE
IF XSMSTAL
THEN stall
ELSE SETA_f;

STATE SETA_f:
IF MBMCLR # XSMSTOP
THEN idle
```

ELSE
IF XSMSTAL
THEN stall
ELSE SETA_g;

STATE SETA_g:
IF MBMCLR # XSMSTOP
THEN idle
ELSE
IF XSMSTAL
THEN stall
ELSE SETA_h;

STATE SETA_h:
IF MBMCLR # XSMSTOP
THEN idle
ELSE
IF XSMSTAL
THEN stall
ELSE SETA_i;

STATE SETA_i:
IF MBMCLR # XSMSTOP
THEN idle
ELSE
IF XSMSTAL
THEN stall
ELSE SETA_j;

STATE SETA_j:
IF MBMCLR # XSMSTOP
THEN idle
ELSE
IF XSMSTAL
THEN stall
ELSE SETA_l;

STATE SETA_k:
IF MBMCLR

```
THEN idle
ELSE close;

STATE SETA_l:
IF MBMCLR # XSMSTOP
THEN idle
ELSE
IF XSMSTAL
THEN stall
ELSE SETA_m;

STATE SETA_m:
IF MBMCLR # XSMSTOP
THEN idle
ELSE SETA_m;

Refresh During Stall

STATE SETB_a:
IF MBMCLR
THEN idle
ELSE SETB_b;

STATE SETB_b:
if MBMCLR
THEN idle
ELSE SETB_c;

STATE SETB_c:
IF MBMCLR
THEN idle
ELSE SETB_d;

STATE SETB_d:
IF MBMCLR
THEN idle
ELSE stall;
```

V. REGISTERS a. Physical Address Register (PAR)

The physical address register (PAR) captures the address of each transaction presented by microprocessor 12-20. The register stops capturing when an NMI is signalled and begins capturing again when the NMI is acknowledged by the reading of the contents of the syndrome register. The NMI handler software of the microprocessor 12-20 may determine the state of the control leads M/O, D/C, and W/R of the offending transaction by reading the channel address register. The data returned in response to a PAR read operation is byte-swapped and the two most significant bits are inverted. The PAR is read in response to a function code value of 60.

b. Channel Address Register (CAR)

The channel address register is preloaded by software prior to issuing a series of I/O commands. It is a 16-bit register used to store an I/O channel number in bit positions 9-0 to be transmitted to the system bus 16 to specify the I/O destination address of a microprocessor issued INw/OUTw command on I/O operations. Additionally, bit positions 12-10 store the states of the M/IO, D/C, and W/R leads of each transaction issued by microprocessor 12-20. The CAR register is read in response to a function code value of 40 and written in response to a function code value of 41.

While in accordance with the provisions and statues there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A processing unit coupled to a system bus for transferring and receiving requests, said processing unit comprising:

a synchronous local bus;

a microprocessor including a synchronous independently operated microprocessor bus state machine coupled to said synchronous local bus for controlling access to said synchronous local bus according to a predetermined protocol;

a local memory tightly coupled to said synchronous local bus, said memory including a synchronous independently operated memory state machine for controlling processing of local commands received from said microprocessor and external commands received from said system bus;

a synchronous independently operated processor state machine tightly coupled to said synchronous local bus and to said system bus for controlling transfer of microprocessor issued read and write commands from said synchronous local bus to said system bus; and a synchronous independently operated external state machine tightly coupled to said synchronous local bus and to said system bus for controlling the transfer of external read and write commands received from said system bus to said local memory, each of said state machines including synchronizing circuit means for generating signals to selectively interconnect different ones of said state machines together for sharing access to said local bus without interference to enable optimum performance in processing commands.

2. The processing unit of claim 1 wherein said processing unit further includes a clock generator circuit for generating a single frequency clocking signal for synchronizing the operations of each of said state machines for accessing said synchronous local bus.

3. The processing unit of claim 1 wherein said synchronizing circuit means of said processor state machine includes first circuit interface means coupled to said external state machine, said first circuit interface means generating a backoff allow signal for selectively enabling said external state machine to access said synchronous local bus for initiating local memory cycles of operation as a function of a type of microprocessor command being processed by said processor state machine.

4. The processing unit of claim 3 wherein said processor state machine first circuit interface means generates said backoff allow signal only when processing external commands issued by said microprocessor to said system bus.

5. The processing unit of claim 3 wherein said external state machine synchronizing circuit means includes third circuit interface means coupled to said microprocessor bus state machine, said third circuit interface means generating a backoff signal to said microprocessor bus state machine for gaining control to said synchronous local bus for transferring external commands to said local memory.

6. The processing unit of claim 3 wherein said processor state machine inhibits said backoff allow signal in response to each internal read or write request received from said microprocessor.

7. The processing unit of claim 1 wherein said memory state machine synchronizing circuit means coupled to said microprocessor bus state machine and to said external state machine, said synchronizing circuit means including second circuit interface means for generating a hold inhibit acknowledge signal for selectively enabling said microprocessor bus state machine to release control of said synchronous local bus to said external state machine only when said memory state machine is in a state for processing a next memory command thereby enabling said external state machine to issue commands as early as possible in the absence of said hold inhibit signal.

8. The processing unit of claim 7 wherein said second circuit interface means generates said hold inhibit signal when completing processing of a local memory request from said processor state machine.

9. The processing unit of claim 1 wherein each of said state machines includes a number of programmable array logic (PAL) circuits for synchronously generating sequences of predetermined states for enabling processing of said requests.

10. The processing unit of claim 1 wherein said microprocessor bus state machine and said external state machine each sequences through a series of states for generating signals according to said predetermined protocol for gaining master control of said synchronous local bus.

11. The processing unit of claim 1 wherein said microprocessor bus state machine and said external state machine, each include address strobe generating means for applying address strobe signals to said processor state machine and to said memory state machine respectively upon gaining control of said synchronous local bus.

12. The processing unit of claim 1 wherein said processor state machine includes programmable array logic (PAL) circuits programmed for generating first predetermined sequences of state signals for performing operations required for executing commands issued by said microprocessor.

13. The processing unit of claim 1 wherein said memory state machine includes programmable array logic (PAL) circuits programmed for generating second predetermined sequences of state signals for performing read and write memory operations required for executing commands received from said microprocessor bus and external state machines.

14. The processing unit of claim 1 wherein said external state machine includes programmable array logic (PAL) circuits programmed for generating third predetermined sequences of state signals for performing operation required for issuing said external commands to said local memory.

* * * * *